US010001114B1

(12) United States Patent
Jessop

(10) Patent No.: US 10,001,114 B1
(45) Date of Patent: Jun. 19, 2018

(54) CONTINUOUS FLOW PUMPING SYSTEM

(71) Applicant: Jessop Initiatives LLC, Fargo, ND (US)

(72) Inventor: Louis M. Jessop, Fargo, ND (US)

(73) Assignee: Jessop Initiatives LLC, Fargo, ND (US)

( * ) Notice: Subject to any disclaimer, the term of this patent is extended or adjusted under 35 U.S.C. 154(b) by 34 days.

(21) Appl. No.: 15/471,959

(22) Filed: Mar. 28, 2017

(51) Int. Cl.
| | |
|---|---|
| *F04B 15/02* | (2006.01) |
| *F04B 49/22* | (2006.01) |
| *F04B 1/02* | (2006.01) |
| *F04B 23/02* | (2006.01) |
| *F04B 53/10* | (2006.01) |
| *F16K 11/074* | (2006.01) |
| *F04B 7/00* | (2006.01) |
| *F04B 1/00* | (2006.01) |

(52) U.S. Cl.
CPC ............. *F04B 15/023* (2013.01); *F04B 1/02* (2013.01); *F04B 7/0019* (2013.01); *F04B 7/0096* (2013.01); *F04B 23/02* (2013.01); *F04B 49/22* (2013.01); *F04B 53/10* (2013.01); *F16K 11/0743* (2013.01); *F04B 1/005* (2013.01); *F04B 15/02* (2013.01)

(58) Field of Classification Search
CPC .......... F04B 7/0023; F04B 1/02; F04B 15/02; F04B 15/023; F04B 23/02; F04B 23/025; F04B 7/0019; F04B 7/0042; F04B 7/0046; F04B 7/0096; F04B 7/0088; F04B 7/0084; F04B 11/005; F04B 49/22; F04B 53/10; Y10T 137/8782; Y10T 137/886847; Y10T 137/86855; F16K 11/074; F16K 11/0743

See application file for complete search history.

(56) References Cited

U.S. PATENT DOCUMENTS

| | | | |
|---|---|---|---|
| 3,398,693 A | 8/1968 | Schumann | |
| 3,663,129 A * | 5/1972 | Antosh | F04B 7/0034 |
| | | | 417/516 |
| 3,877,847 A | 4/1975 | Bille | |
| 4,373,875 A | 2/1983 | Schwing | |
| 4,563,135 A | 1/1986 | Riker | |

(Continued)

OTHER PUBLICATIONS

Rock Valve Brochure by Schwing, Received and Printed Jan. 4, 2017.

*Primary Examiner* — Bryan Lettman
(74) *Attorney, Agent, or Firm* — Neustel Law Offices

(57) ABSTRACT

A continuous flow pumping system which provides a continuous flow of materials out of an outlet while eliminating rough stroke shift and boom bounce. The continuous flow pumping system generally includes a container for storing a material to be dispensed such as concrete. Cylinders are fluidly connected to the container such that the materials may be alternatively pulled into the cylinders or pushed out of the cylinders. A diverter valve is connected to the container adjacent the cylinders which includes a valve inlet through which the materials may be pushed to be dispensed and a pair of blocking portions which selectively cover the cylinders and also serve to cut through the materials. By rotating the diverter valve through a plurality of positions while independently controlling the intake and exhaust strokes of the cylinders, a continuous flow of materials may be ensured across all intake/exhaust strokes of the cylinders.

3 Claims, 40 Drawing Sheets

(56) References Cited

U.S. PATENT DOCUMENTS

| | | | |
|---|---|---|---|
| 4,854,838 A | 8/1989 | Swain | |
| 5,316,453 A * | 5/1994 | Schwing | F04B 7/0258 417/516 |
| 5,360,321 A | 11/1994 | Benckert | |
| 5,380,174 A * | 1/1995 | Schwing | F04B 7/0026 417/519 |
| 5,857,490 A * | 1/1999 | Kao | F04B 7/0034 137/625.45 |
| 5,950,677 A * | 9/1999 | Bhide | F16K 11/074 137/625.45 |
| 5,993,181 A * | 11/1999 | Hudelmaier | F04B 7/0034 417/519 |
| 6,422,840 B2 | 7/2002 | Anderson | |
| 8,231,362 B2 * | 7/2012 | Winkler | F04B 41/06 417/342 |
| 8,827,657 B1 * | 9/2014 | Priddy | F04B 7/04 137/874 |
| 2004/0071575 A1 * | 4/2004 | Reinert | F04B 7/0011 417/517 |
| 2007/0196224 A1 * | 8/2007 | Lenhart | F04B 15/023 417/517 |
| 2012/0318390 A1 * | 12/2012 | Yi | B65G 53/32 137/625 |
| 2016/0348655 A1 * | 12/2016 | Merten | F04B 7/0096 |

\* cited by examiner

CONTINUOUS FLOW PUMPING SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND

Field

Example embodiments in general relate to a continuous flow pumping system which provides a continuous flow of materials out of an outlet while eliminating rough stroke shift and boom bounce.

Related Art

Any discussion of the related art throughout the specification should in no way be considered as an admission that such related art is widely known or forms part of common general knowledge in the field.

Pumps are in wide use for a range of materials. One such type of pump which is commonly used to pump materials such as concrete utilizes a pair of parallel cylinders which alternatively pull the materials from a container or push the materials out of the container in a plunger-type configuration.

While these systems are functional in that they pump materials, they typically must pause to stroke the cylinders and have an instant shift cycle which can cause whiplash. This limits speed and volume over time and is also a safety hazard. The snap and jerk caused by the whiplash of the outlet (such as a boom) also can result in high maintenance costs. This limits high volume output in most cases, as the system must be slowed down to prevent such whiplash.

SUMMARY

An example embodiment is directed to a continuous flow pumping system. The continuous flow pumping system includes a container for storing a material to be dispensed such as concrete. Cylinders are fluidly connected to the container such that the materials may be alternatively pulled into the cylinders or pushed out of the cylinders. A diverter valve is connected to the container adjacent the cylinders which includes a valve inlet through which the materials may be pushed to be dispensed and a pair of blocking portions which selectively cover the cylinders and also serve to cut through the materials.

By rotating the diverter valve through a plurality of positions while independently controlling the intake and exhaust strokes of the cylinders, a continuous flow of materials may be ensured across all intake/exhaust strokes of the cylinders. Flow pause which is common in previous pumping systems due to bypass between the cylinders at the valve is completely eliminated by the blocking portions of the diverter valve.

Pressure is maintained consistently across all stroke cycles since even high pressure cannot dissipate every stroke shift. Consistent exhaust flow across all stroke cycles is maintained by the blocking portions preventing bypass. This also enhances the efficiency of the system overall as energy force is not wasted every stroke from pressure dissipation caused by bypass as with previous systems.

There has thus been outlined, rather broadly, some of the embodiments of the continuous flow pumping system in order that the detailed description thereof may be better understood, and in order that the present contribution to the art may be better appreciated. There are additional embodiments of the continuous flow pumping system that will be described hereinafter and that will form the subject matter of the claims appended hereto. In this respect, before explaining at least one embodiment of the continuous flow pumping system in detail, it is to be understood that the continuous flow pumping system is not limited in its application to the details of construction or to the arrangements of the components set forth in the following description or illustrated in the drawings. The continuous flow pumping system is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

A. Overview

Figure 1:
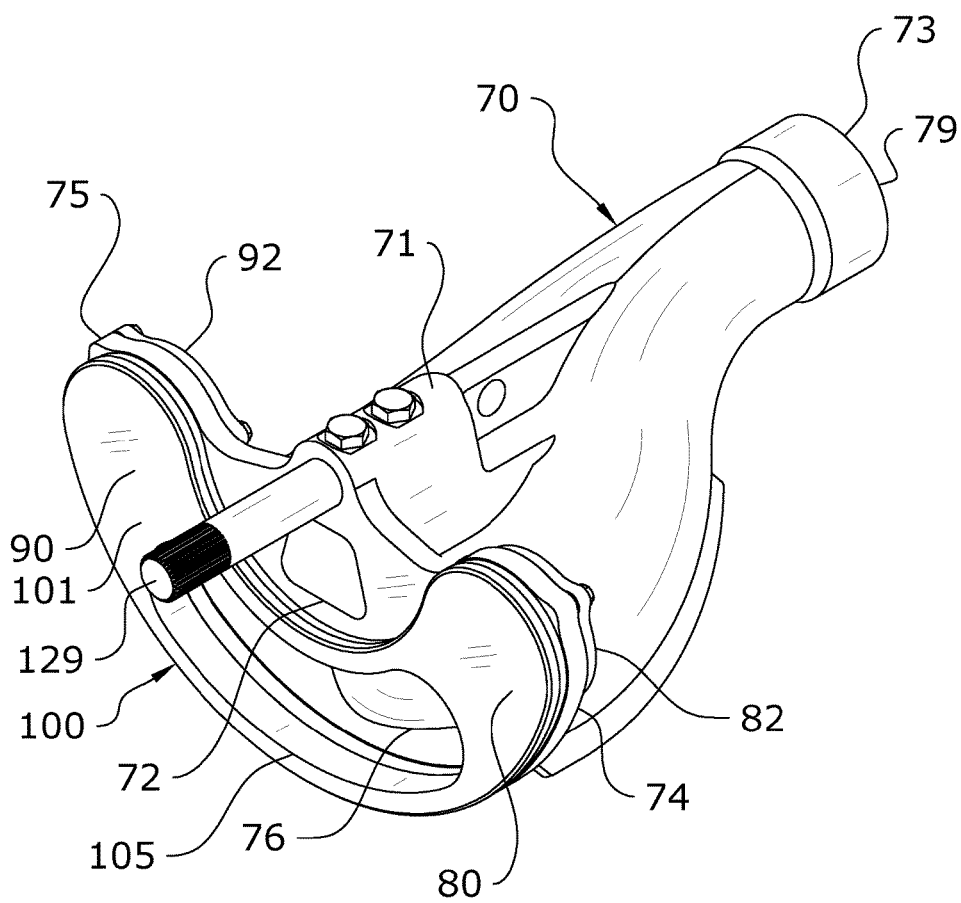
FIG. 1 is a frontal perspective view of a diverter valve of a continuous flow pumping system in accordance with an example embodiment.

An example continuous flow pumping system generally comprises a container 20 for storing a material 12 to be dispensed such as concrete. A pair of parallel cylinders 40, 50 are fluidly connected to the container 20 such that the materials 12 may be alternatively pulled into the cylinders 40, 50 or pushed out of the cylinders 20. A diverter valve 70 is connected to the container 20 adjacent the cylinders 40, 50; the diverter valve 70 includes a valve inlet 76 through which the materials 12 may be pushed to be dispensed out of an outlet opening 32 of the container 20 and a pair of blocking portions 80, 90 which selectively cover the cylinders 40, 50 and also serve to cut through the materials 12. By rotating the diverter valve 70 through a plurality of positions while independently controlling the intake and exhaust strokes of the cylinders 40, 50, a continuous flow of materials 12 may be ensured across all intake/exhaust strokes of the cylinders 40, 50.

B. Container

As shown throughout the figures, the continuous flow pumping system 10 may include a container 20 which stores a volume of material 12 to be pumped to another location. Various types of materials 12 may be stored in the container 20 to be pumped, such as concrete. The shape, size, and configuration of the container 20 may vary in different embodiments. Thus, the exemplary container 20 shown in the figures should not be construed as limiting the scope of the shape, size, and/or configuration of the container 20. In some embodiments, the container 20 may comprise a hopper.

As best shown in FIGS. 22a-22e, the container 20 generally comprises a first end 21 and a second end 22. The container 20 may include inner walls 23 and outer walls 24. The inner walls 23 of the container 20 define a cavity 26 in which the materials 12 are stored to be pumped out of an outlet opening 32 of the container 20. An upper opening 26 in the container 20 provides access to the container 20 so that the cavity 26 may be filled with the materials 12.

Figure 25A:
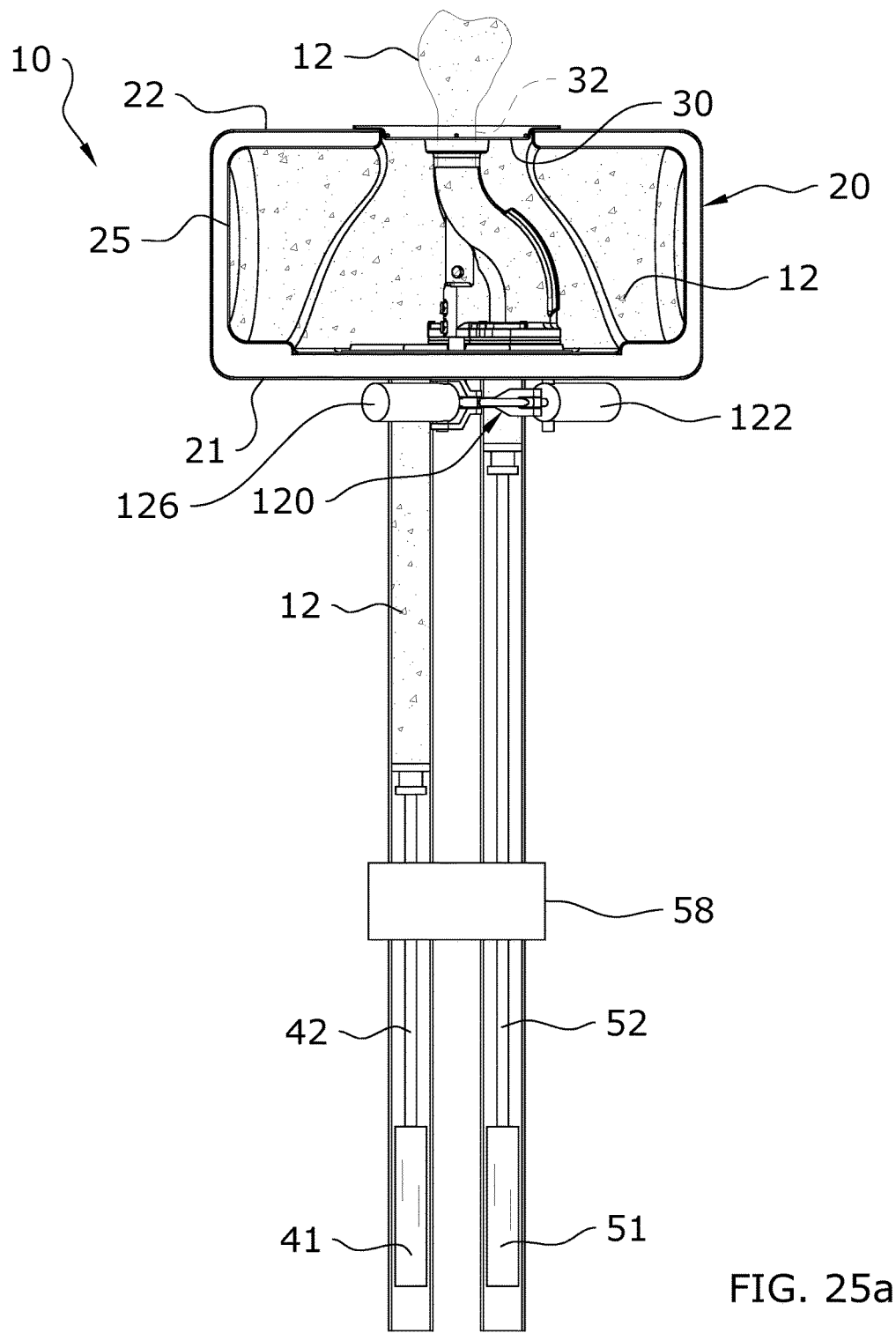
FIG. 25a is a top sectional view illustrating continuous flow of materials during all stroke cycles of a continuous flow pumping system in accordance with an example embodiment.
Figure 25B:
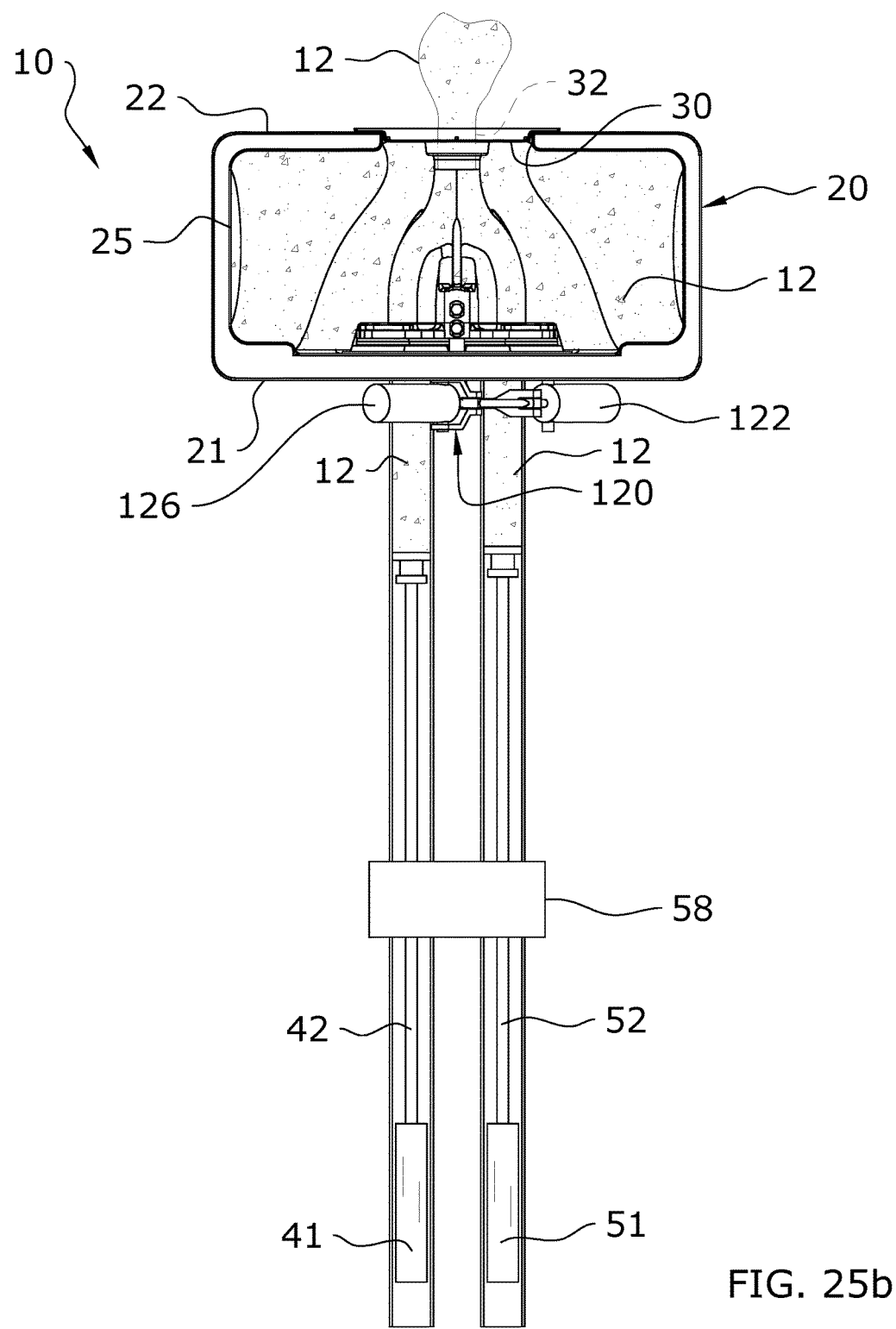
FIG. 25b is a top sectional view illustrating continuous flow of materials during all stroke cycles of a continuous flow pumping system in accordance with an example embodiment.
Figure 25C:
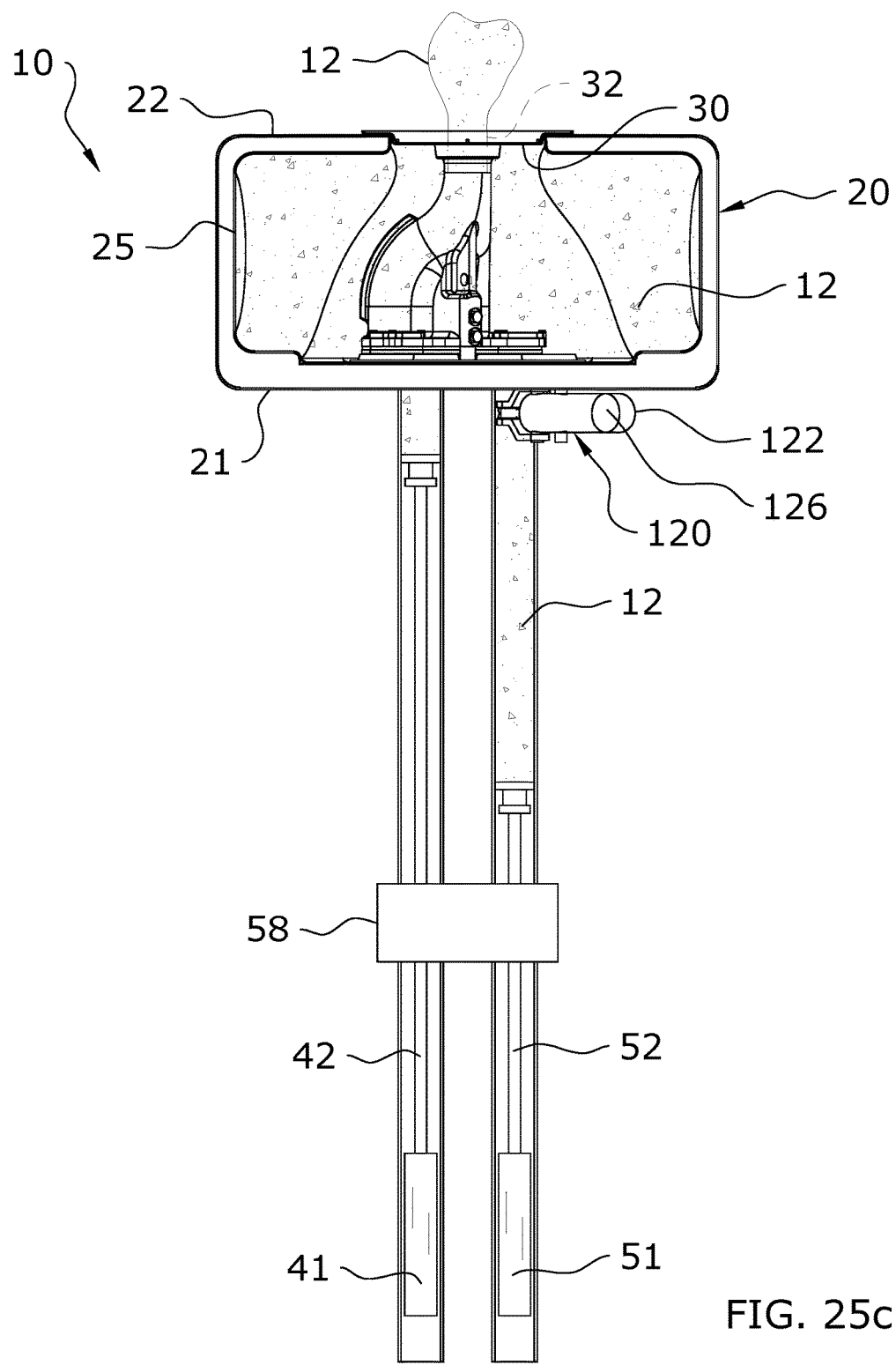
FIG. 25c is a top sectional view illustrating continuous flow of materials during all stroke cycles of a continuous flow pumping system in accordance with an example embodiment.
Figure 26:
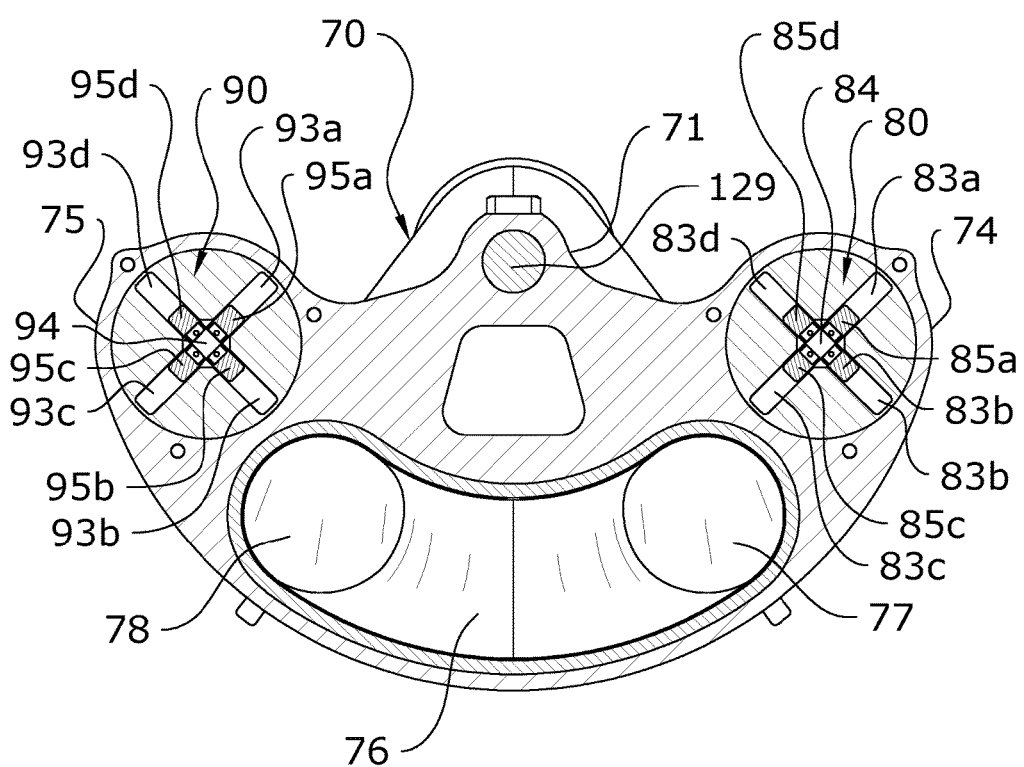
FIG. 26 is a sectional view of a diverter valve of a continuous flow pumping system in accordance with an example embodiment.
Figure 27:
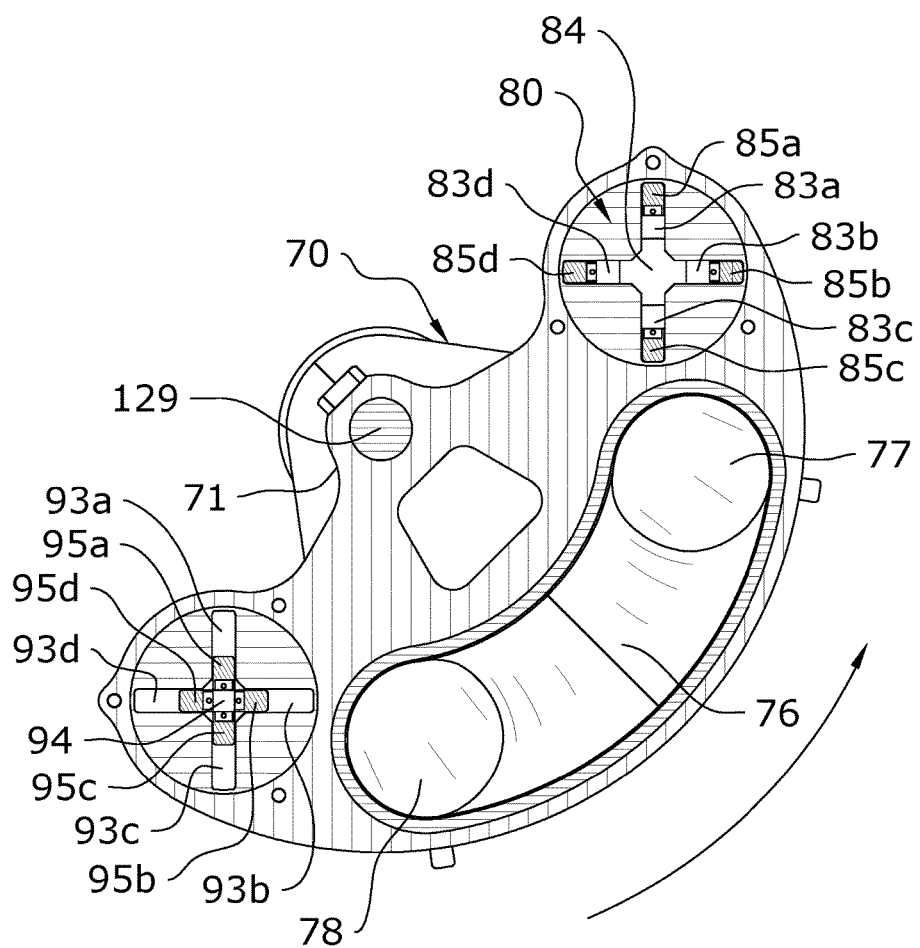
FIG. 27 is a sectional view of a diverter valve rotated to a first position with the second blocking member being engaged.
Figure 28:
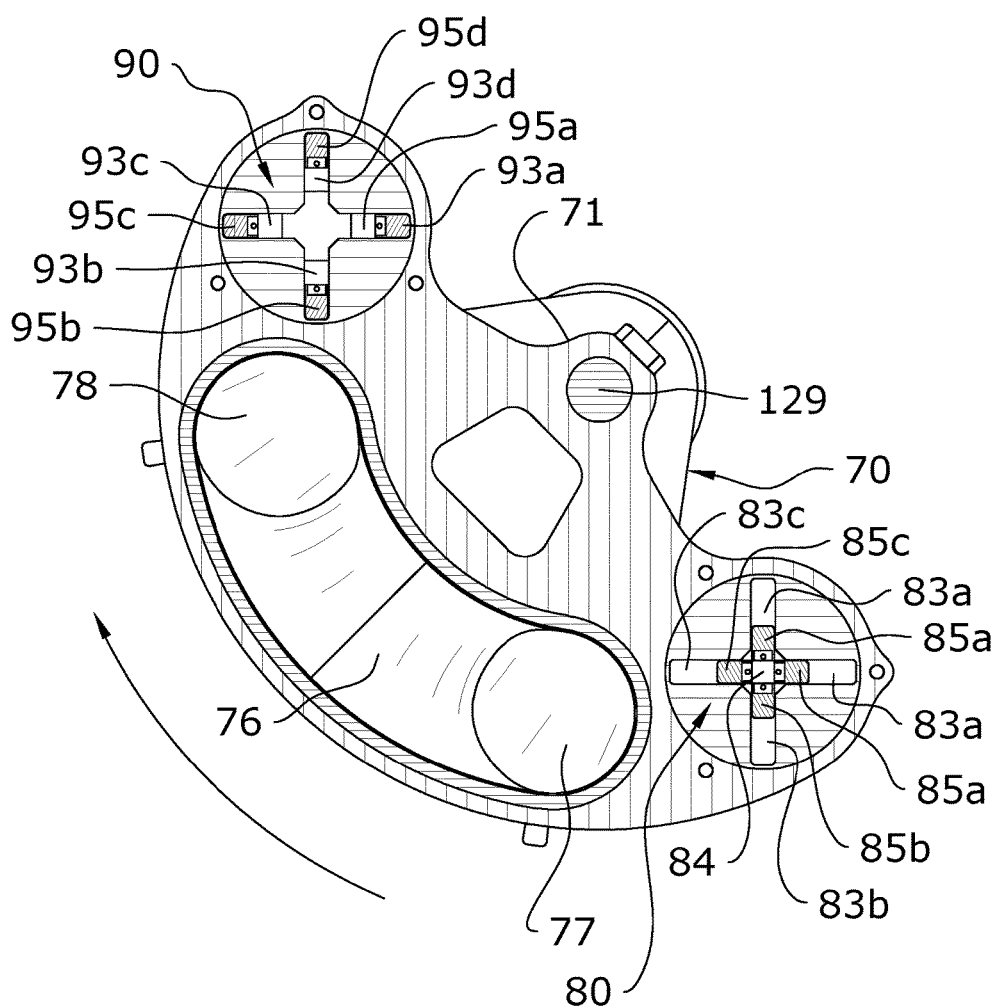
FIG. 28 is a sectional view of a diverter valve rotated to a second position with the first blocking member being engaged.

As best shown in FIGS. 25a-25c, the container 20 may comprise an outlet opening 32 through which materials are pumped by the continuous flow pumping system 10. In the embodiment shown in the figures, the outlet opening 32 is positioned at the second end 22 of the container 20.

The container 20 may also comprise a first transfer opening 34 and a second transfer opening 35 through which the materials 12 may be drawn into the first and second cylinders 40, 50 and through which the materials 12 may be pumped to the outlet opening 32 via the diverter valve 70 as discussed herein. The first transfer opening 34 and second transfer opening 35 are generally positioned on the first end 21 of the container 20 as shown in FIGS. 21a-21e.

The first and second transfer openings 34, 35 may be horizontally aligned as shown in the figures, or other orientations may be utilized. The shape and size of the first and second transfer opening 34, 35 may vary and thus should not be construed as limited by the exemplary figures. Similarly, the spacing between the first and second transfer openings 34, 35 may vary between different embodiments to suit different applications.

As best shown in FIGS. 22a-22e, the container 20 may include an outlet plate 30 positioned on the second end 22 of the container 20. The outlet plate 30 may be connected to the container 20 or may be integrally formed with the container 20. The outlet opening 32 generally extends through the outlet plate 30 as shown in the figures. In some embodiments, a separate outlet connector 31 may be positioned within the outlet opening 32, with the valve outlet 79 extending through the outlet connector 31 such as shown in FIGS. 22a-22e.

The outlet plate 30 may comprise a more durable material than the remainder of the container 20; the durable material being adapted to not be structurally compromised by the repeated rotation of the valve outlet 79 of the diverter valve 70 within the outlet opening 32. The shape, size, and configuration of the outlet plate 30 may vary in different embodiments. Additionally, the outlet plate 30 may be omitted in some embodiments, with the outlet opening 32 instead extending directly through the container 20.

As best shown in FIGS. 22a-22e, the container 20 may also include a central opening through which pivot connector 129 of the diverter valve 70 may extend. The pivot connector 129 generally extends through the first end of the container 20 as shown in the figures. The central opening where the pivot connector 129 extends through the container 20 is generally positioned between the first and second transfer openings 34, 35. The central opening may be vertically spaced with respect to the first and second transfer openings 34, 35; such as in the figures where the pivot connector 129 is extends through the container 20 above the first and second transfer openings 34, 35.

C. Cylinders

As shown throughout the figures, a pair of cylinders 40, 50 are fluidly connected to the container 20. Each cylinder 40, 50 independently either pulls materials 12 from the cavity 26 of the container 20 through the transfer openings 34, 35 or pushes materials 12 through the diverter valve 70 to be dispensed through the outlet opening 32 of the container 20.

The positioning of the diverter valve 70 controls whether a cylinder 40, 50 is pushing materials 12 on an exhaust stroke or pulling materials 12 on an intake stroke. For example, when the valve inlet 76 of the diverter valve 70 is rotated to cover the first transfer opening 34 such as shown in FIG. 21b, materials 12 will flow from the first cylinder 40 through the diverter valve 70 and out the outlet opening 32 of the container.

Figure 21A:
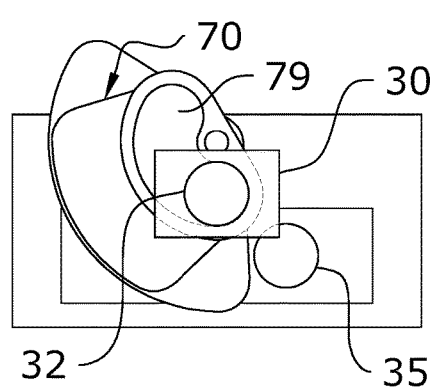
FIG. 21a is a frontal view illustrating one of a plurality of positions of the diverter valve of a continuous flow pumping system in accordance with an example embodiment.
Figure 21B:
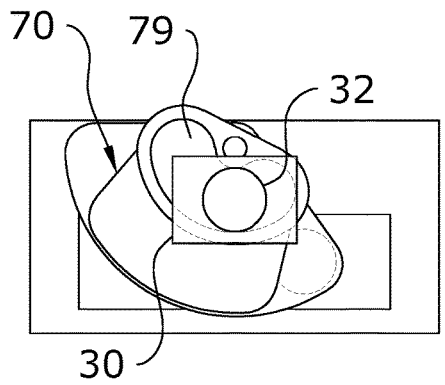
FIG. 21b is a frontal view illustrating one of a plurality of positions of the diverter valve of a continuous flow pumping system in accordance with an example embodiment.
Figure 21C:
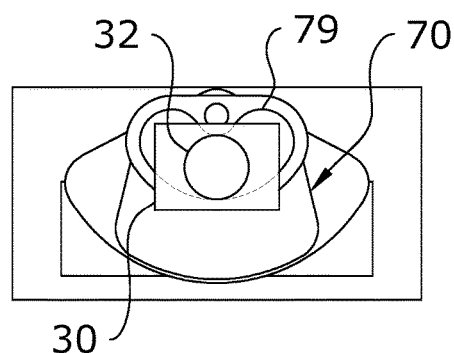
FIG. 21c is a frontal view illustrating one of a plurality of positions of the diverter valve of a continuous flow pumping system in accordance with an example embodiment.
Figure 21D:
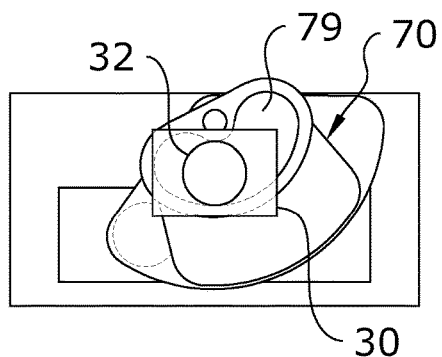
FIG. 21d is a frontal view illustrating one of a plurality of positions of the diverter valve of a continuous flow pumping system in accordance with an example embodiment.
Figure 21E:
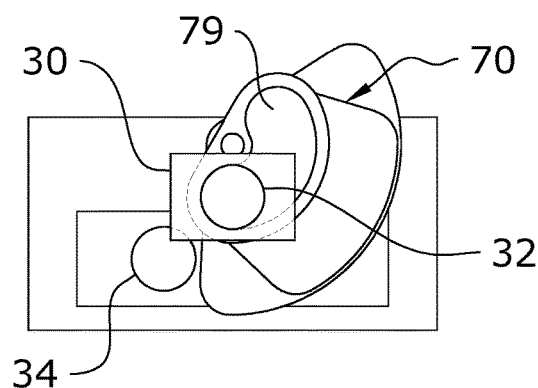
FIG. 21e is a frontal view illustrating one of a plurality of positions of the diverter valve of a continuous flow pumping system in accordance with an example embodiment.

When the diverter valve 70 is rotated such that neither the valve inlet 76 nor the first blocking portion 80 cover the first transfer opening 34 such as shown in FIG. 21e, the first cylinder 40 will draw or pull materials from the container 20 into the first cylinder 40 to be pushed out on the next exhaust stroke.

The same principles similarly apply to the second cylinder 50. By controlling the positioning and rotation of the diverter valve 70, which selectively and alternately connects the cylinders 40, 50 with the outlet opening 32 of the container 20, a continuous flow of materials 12 out of the outlet opening 32 may be achieved as described in more detail below.

The structure, shape, orientation, and configuration of the cylinders 40, 50 may vary in different embodiments. Both the first cylinder 40 and second cylinder 50 are preferably fluidly connected to the container 20. The diverter valve 70 will selectively open or close this fluid connection between the cylinders 40, 50 and the container 20 allow for the alternate pulling of materials 12 from the container 20 to the cylinders 40, 50 or pushing of materials 12 from the cylinders 40, 50 through the diverter valve 70 to be outputted by the outlet opening 32 of the container 20.

In the embodiment shown in the figures, a first cylinder 40 is fluidly connected to the container 20 by, for example, being fluidly connected to the first transfer opening 34 of the container 20. Similarly, a second cylinder 50 is fluidly connected to the container 20 by, for example, being fluidly connected to the second transfer opening 35 of the container 20.

The figures illustrate exemplary embodiments of the cylinders 40, 50. Thus, the figures and accompanying description herein should not be construed as limiting the scope of the cylinders 40, 50 with respect to their shape, size, orientation, or configuration. In the exemplary figures such as shown in FIGS. 22a-22e, the first cylinder 40 includes a first cylinder actuator 41 which alternately extends or retracts a first piston rod 42 and the second cylinder 50 includes a second cylinder actuator 51 which alternately extends or retracts a second piston rod 52.

Figure 22A:
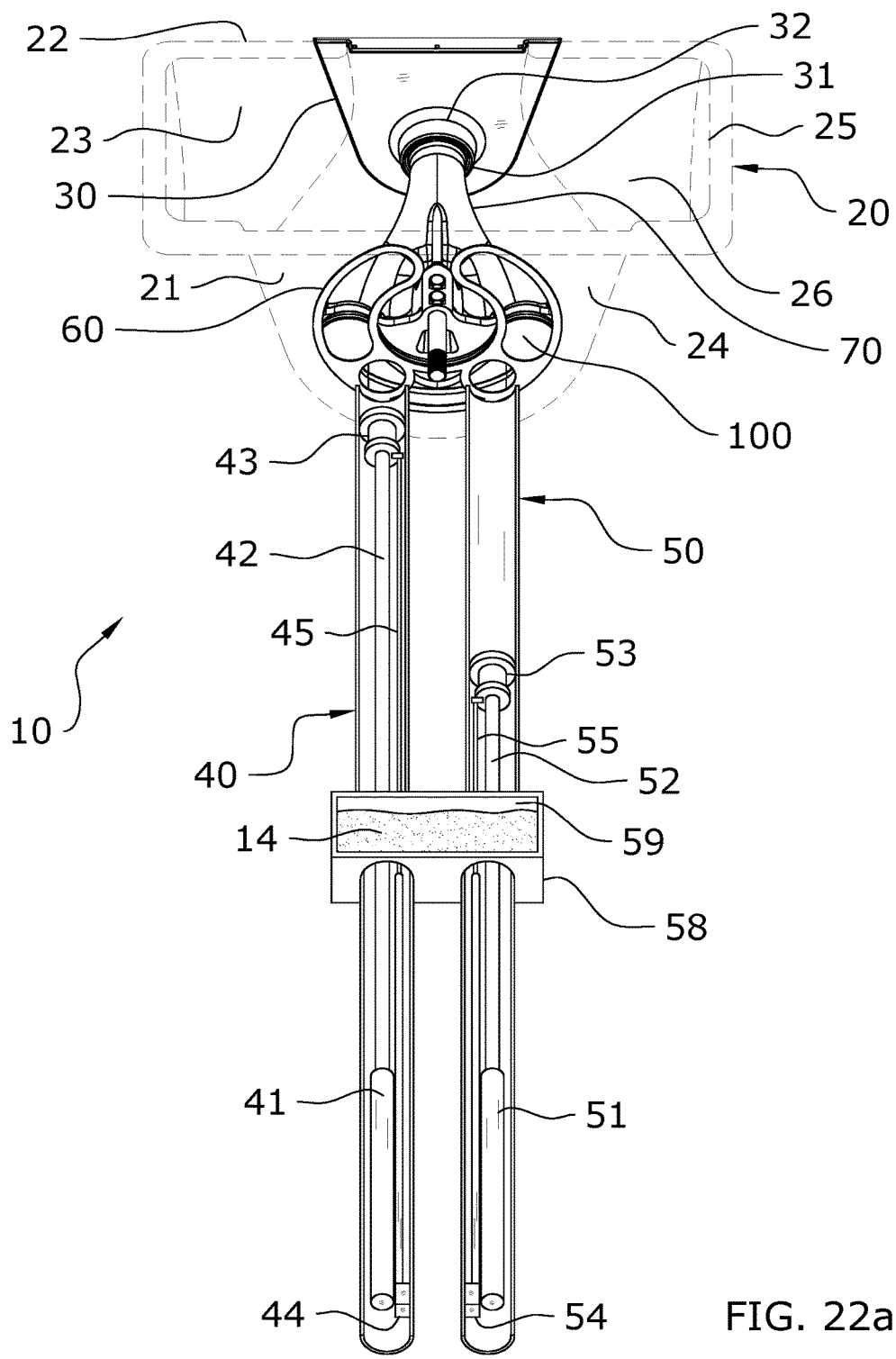
FIG. 22a is a top sectional view illustrating cylinder stroke cycles and diverter valve positioning during operation of a continuous flow pumping system in accordance with an example embodiment.
Figure 22B:
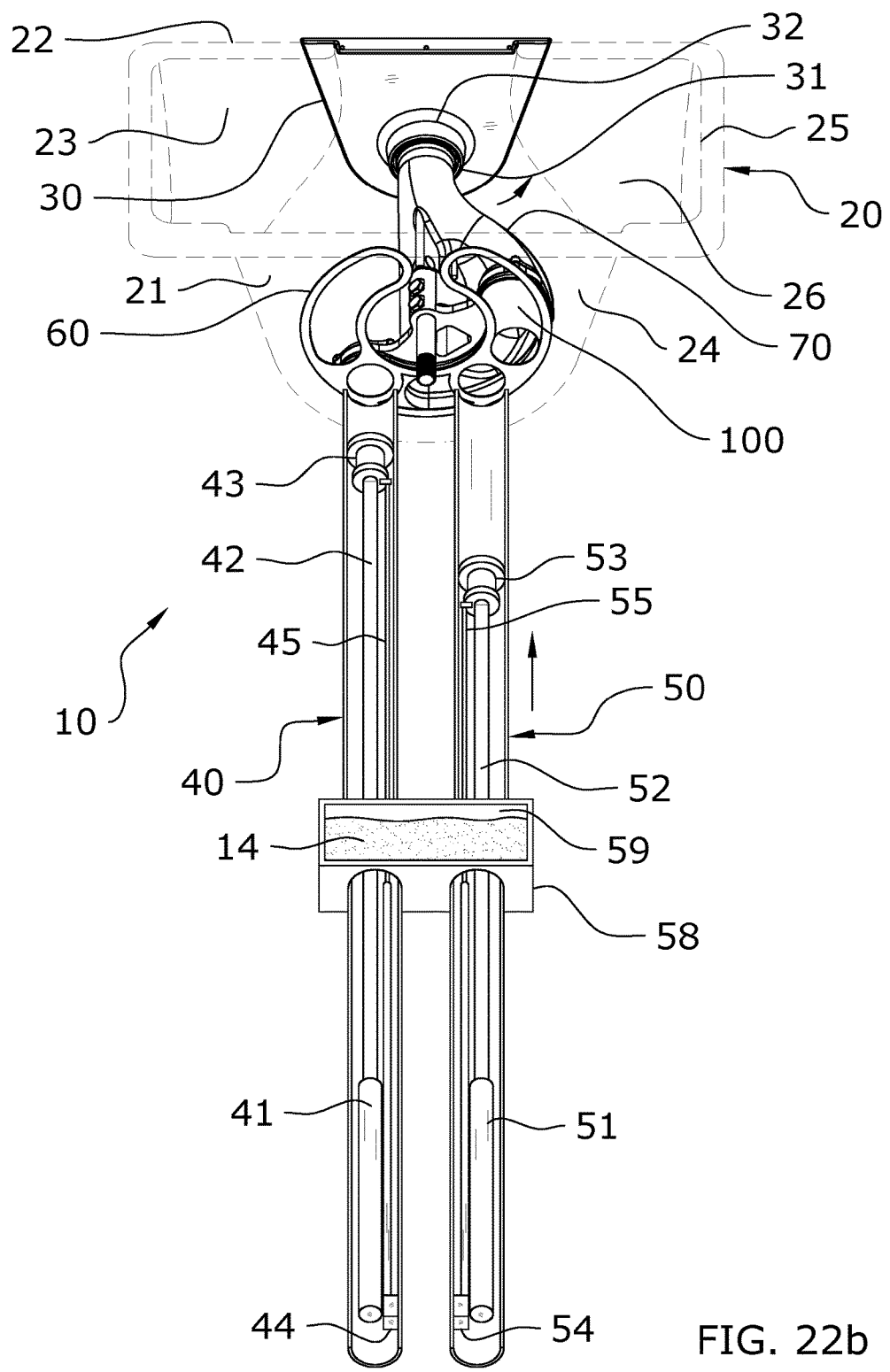
FIG. 22b is a top sectional view illustrating cylinder stroke cycles and diverter valve positioning during operation of a continuous flow pumping system in accordance with an example embodiment.
Figure 22C:
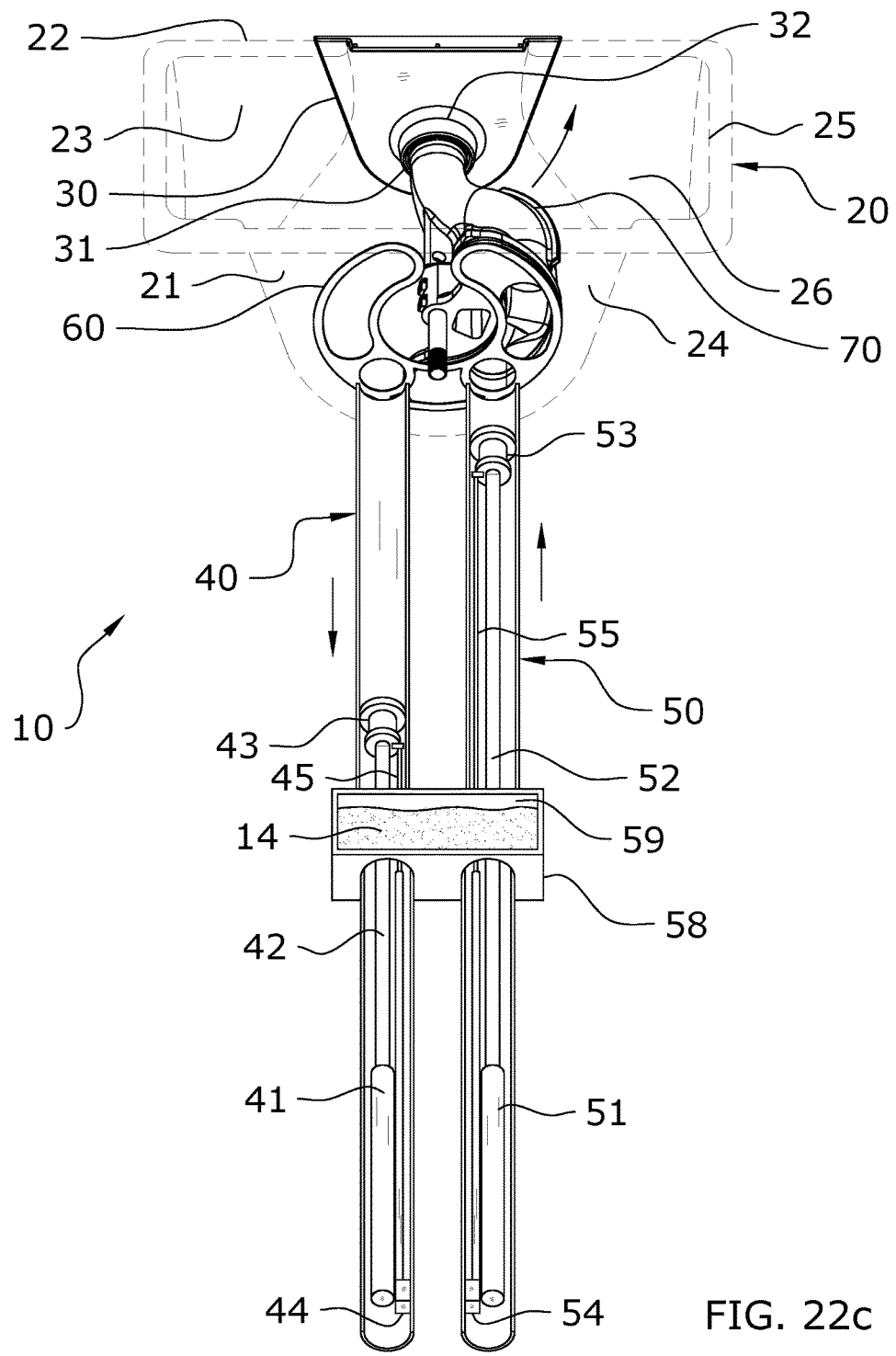
FIG. 22c is a top sectional view illustrating cylinder stroke cycles and diverter valve positioning during operation of a continuous flow pumping system in accordance with an example embodiment.
Figure 22D:
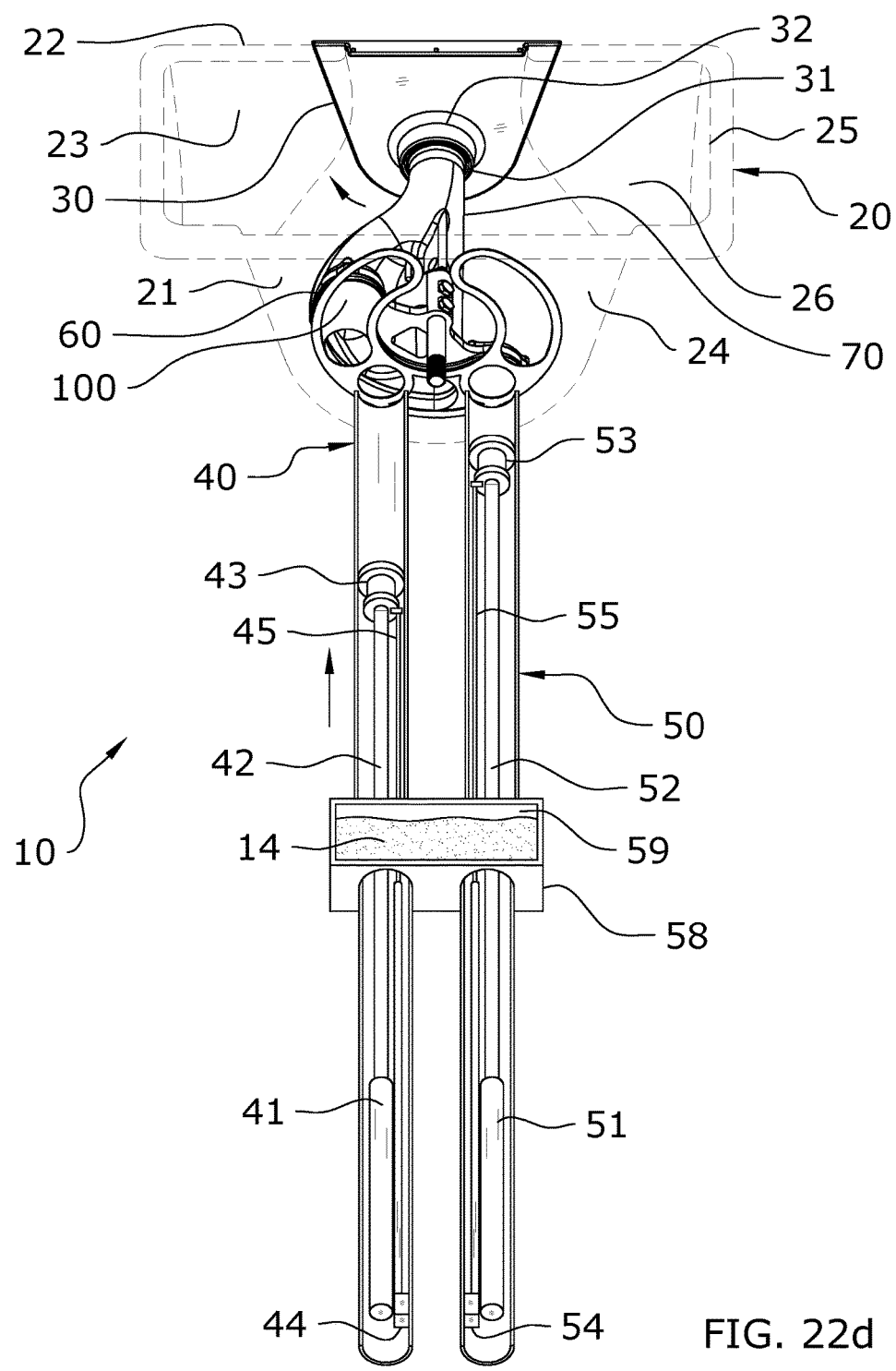
FIG. 22d is a top sectional view illustrating cylinder stroke cycles and diverter valve positioning during operation of a continuous flow pumping system in accordance with an example embodiment.
Figure 22E:
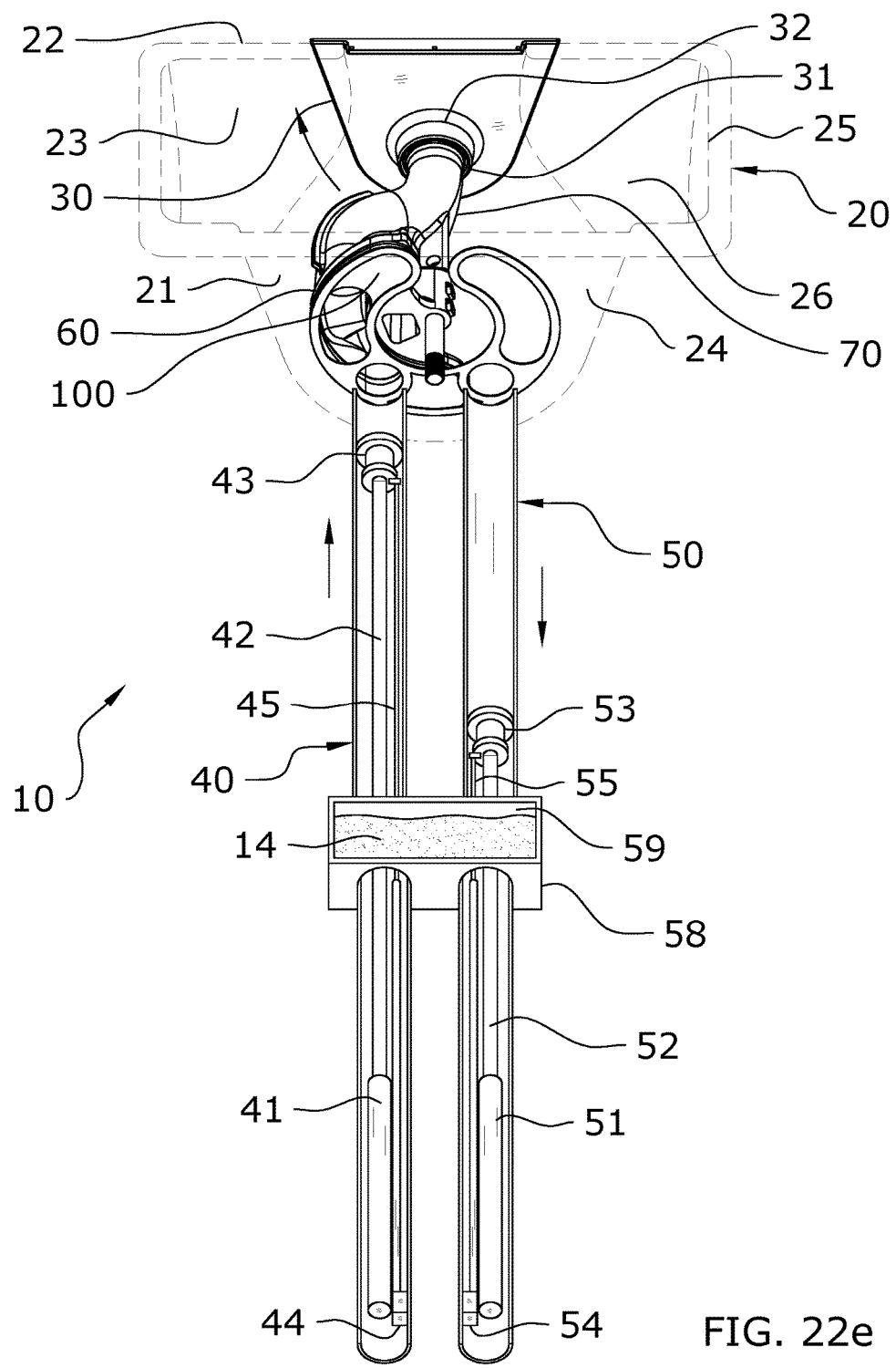
FIG. 22e is a top sectional view illustrating cylinder stroke cycles and diverter valve positioning during operation of a continuous flow pumping system in accordance with an example embodiment.

As shown in FIG. 22a, a first piston 43 is positioned at a distal end of the first piston rod 42; with the first piston 43 being sealed within the first cylinder 40 so that it may create suction to pull materials 12 into the first cylinder 40 from the container 20 or so that it may push the same materials 12 through the diverter valve 70 when the valve inlet 76 is fluidly connected with the first transfer opening 34 to which the first cylinder 40 is fluidly connected.

Similarly, a second piston 53 is positioned at a distal end of the second piston rod 52; with the second piston 53 being sealed within the second cylinder 50 so that it may create suction to pull materials 12 into the second cylinder 50 from the container 20 or so that it may push the same materials 12 through the diverter valve 70 when the valve inlet 76 is fluidly connected with the second transfer opening 35 to which the second cylinder 50 is fluidly connected.

Various types of pistons may be utilized for the first piston 43. In the exemplary figures, the first piston 43 and the second piston 53 each comprise a "mud cup" configuration. It should be appreciated that any type of piston 43, 53 operable to seal and move within the cylinders 40, 50 could be utilized. In some embodiments, the pistons 43, 53 may include wear rings, inner seals, outer seals, and the like.

The pistons 43, 53 of the cylinders 40, 50 are independently controlled by a control assembly 130 which directs flow of hydraulic fluids to, from, and between the pistons 43, 53. The control assembly 130 may comprise various configurations and is described in more detail below. Various methods of control may be utilized and thus the control assembly 130 should not be construed as limited by the exemplary embodiments shown in the figures and described herein.

The cylinders 40, 50 may include sensors 44, 54 which detect the positioning of the respective pistons 43, 53 to control the operation of the cylinders 40, 50 and effectuate a continuous flow of materials 12 being pumped out of the outlet opening 32. One exemplary sensor 44, 54 arrangement is shown in FIGS. 22a-22e, in which a first sensor 44 is adapted to detect the positioning of the first piston 43 within the first cylinder 40 and a second sensor 54 is adapted to detect the positioning of the second piston 53 within the second cylinder 50.

Various types of sensors 44, 54 may be utilized. In FIGS. 22a-22e, each sensor 44 is illustrated as having a sensor extender 45, 55 which extends and retracts with respect to the sensor 44, 54 as the pistons 43, 53 move. More specifically, a first sensor extender 45 is connected between the first sensor 44 and the first piston 43 and a second sensor extender 55 is connected between the second sensor 54 and the second piston 53. In such an arrangement, the sensors 44, 54 will detect the length of the sensor extenders 45, 55 which have been reeled or pulled out by the pistons 43, 53.

While such exemplary sensors 44, 54 are shown in the figures, it should be appreciated that various other arrangements may be utilized. For example, a line of first sensors 44 may extend along the length of the first cylinder 40 and a line of second sensors 54 may extend along the length of the second cylinder 50. The sensors 44, 54 need not necessarily cover the entire length of the cylinders 40, 50 so long as the positioning of the pistons 43, 53 along their entire stroke-paths may be detected efficiently.

Preferably, the sensors 44, 54 are adapted to communicate to the control assembly 130 the precise position of the pistons 43, 53 throughout the entire cycle of both cylinders 40, 50. This configuration allows for precise equal tethering and uniform shifting of the cylinders 40, 50. With such a configuration, regardless of the variable resistance which is ubiquitous with the transfer of materials 12, a continuous flow of the materials 12 will be dispensed by the outlet opening 32 of the container 20.

As best shown in FIGS. 22a-22e, a central container 58 may be positioned in-line with the first and second cylinders 40, 50. The central container 58 may include a central container cavity 59 in which is stored a volume of liquid 14 such as water which improves flow of more viscous materials 12 such as concrete through the continuous flow pumping system 10. In some embodiments, the central container 58 may be omitted.

D. Diverter Valve

As shown throughout the figures, the continuous flow pumping system 10 utilizes a diverter valve 70 which rotates between a plurality of positions to effectuate a continuous flow of materials 12 out of the outlet opening 32 of the container 20. The diverter valve 70 is rotatably connected to the container 20 such that a valve inlet 76 of the diverter valve 70 may be repositioned to selectively fluidly connect with the transfer openings 34, 35 of the container 20.

The diverter valve 70 will generally include a first end 72, a second end 73, a first side 74, and a second side 85 such as shown in FIGS. 1-6. The first end 72 of the diverter valve 70 includes a valve inlet 76 which is rotated between various positions to alternatively cover the first transfer opening 34 or the second transfer opening 34. In a preferred embodiment, the valve inlet 76 of the diverter valve 70 comprises a shape and size sufficient to simultaneously cover both the first transfer opening 34 and the second transfer opening 35 when the diverter valve 70 is so positioned such as shown in FIG. 21c.

Figure 2:
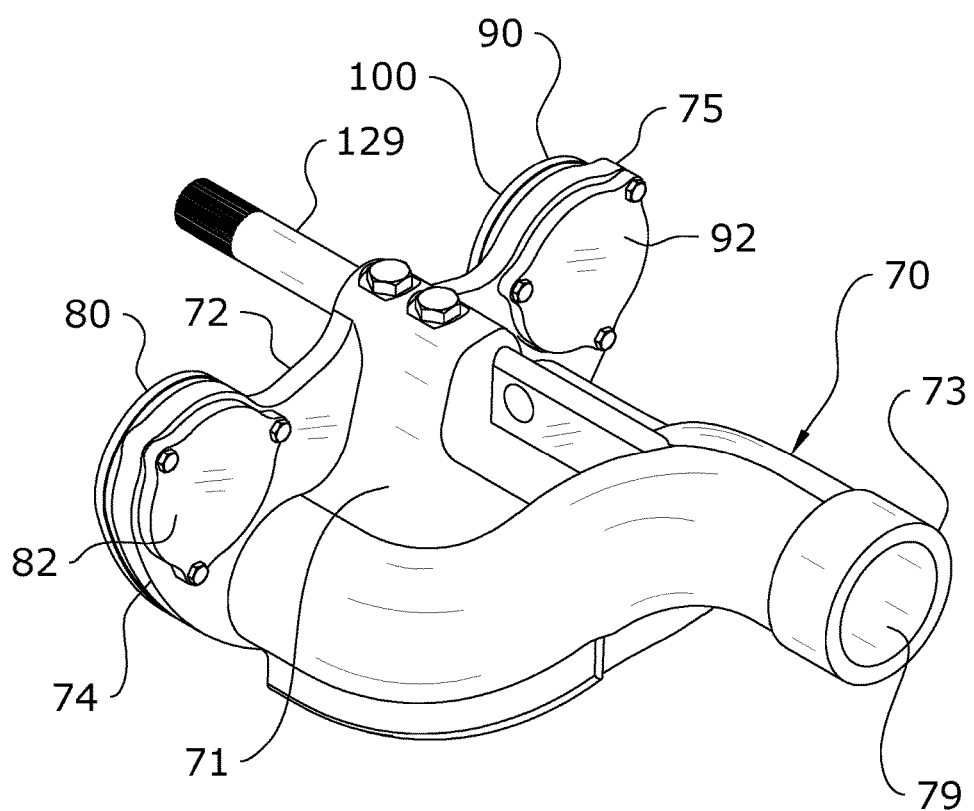
FIG. 2 is a rear perspective view of a diverter valve of a continuous flow pumping system in accordance with an example embodiment.
Figure 3:
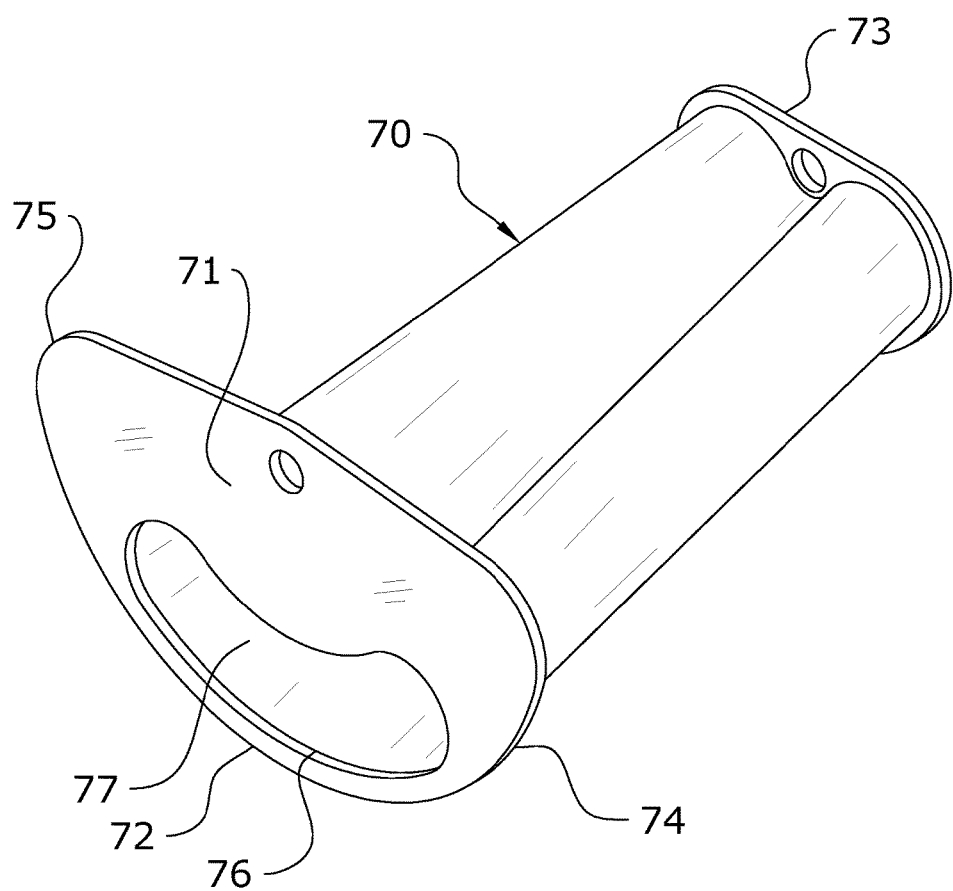
FIG. 3 is a frontal perspective view of an alternate embodiment of a diverter valve of a continuous flow pumping system in accordance with an example embodiment.
Figure 4:
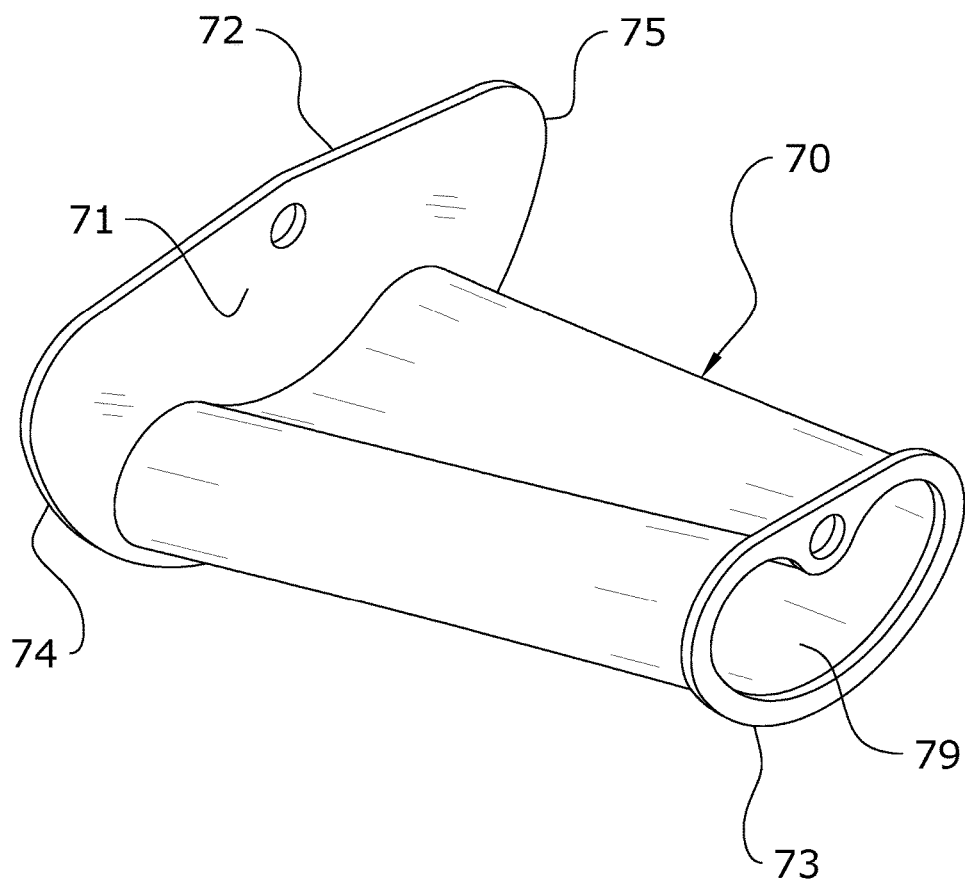
FIG. 4 is a rear perspective view of an alternate embodiment of a diverter valve of a continuous flow pumping system in accordance with an example embodiment.

As best shown in FIG. 2, the second end 73 of the diverter valve 70 may include a valve outlet 79 which is fluidly connected to the outlet opening 32 of the container 20. In a preferred embodiment, the valve outlet 79 rotates within the outlet opening 32 as the first end 72 of the diverter valve 70 is rotated between its various positions such as illustrated in FIGS. 21a-21e.

As shown in the figures, the shape and size of the valve inlet 76 and valve outlet 79 may vary in different embodiments. The valve inlet 76 will preferably be of a size and shape which allows the valve inlet 76 to simultaneously cover both the first transfer opening 34 and the second transfer opening 35 of the container 20 when the diverter valve 70 is rotated into such a position. The valve outlet 79 will preferably be of a size and shape which allows a sealed, rotatable, and fluid connection between the valve outlet 79 and the outlet opening 32 of the container 20.

The valve outlet 79 may be connected within the outlet opening 32, connected around the outlet opening 32, or connected to an outlet connector 31; so long as the valve outlet 79 is free to rotate with respect to the container 20 while maintaining its sealed, fluid connection with the outlet opening 32 of the container 20 to allow for continuous flow out of the outlet opening 32 of materials 12 from the valve outlet 79.

FIGS. 1-2 illustrate a first embodiment of a diverter valve 70 which includes a valve inlet 76 which is kidney-shaped such that the valve inlet 76 may simultaneously cover both the first transfer opening 34 and the second transfer opening 35 of the container 20. In this embodiment, the valve outlet 79 which is fluidly connected to the outlet opening 32 of the container 20 comprises a circular shape.

Continuing to reference FIGS. 1-2, this embodiment of the diverter valve 70 may utilize a pair of split channels 77, 78 which lead from the valve inlet 76 to converge at the valve outlet 79. As shown in FIGS. 7-10, the first channel 77 extends between a first side of the valve inlet 76 and the valve outlet 79. The second channel 78 extends between a second side of the valve inlet 76 and the valve outlet 79, with the first and second channels 77, 78 converging at the valve outlet 79.

FIGS. 3-6 illustrate a second embodiment of a diverter valve 70 which includes a valve inlet 76 which is kidney-shaped such that the valve inlet 76 may simultaneously cover both the first transfer opening 34 and the second transfer opening 35 of the container 20. In this embodiment, the valve outlet 79 which is fluidly connected to the outlet opening 32 of the container 20 comprises a kidney shape; with the valve outlet 79 of the diverter valve 70 being smaller than the valve inlet 76 of the diverter valve 70.

Figure 5:
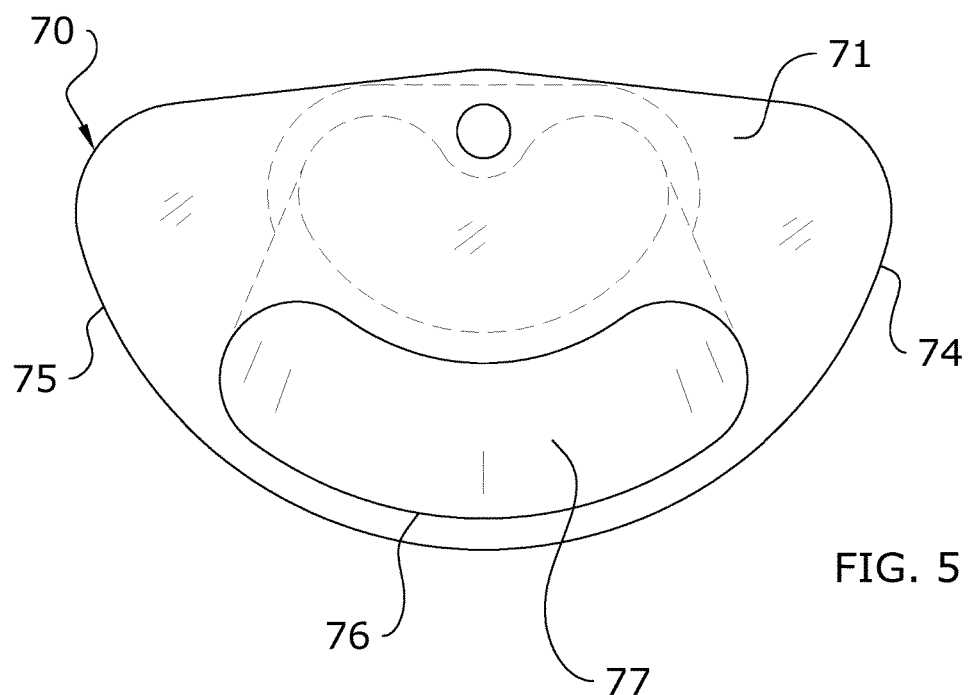
FIG. 5 is a frontal view of an alternate embodiment of a diverter valve of a continuous flow pumping system in accordance with an example embodiment.
Figure 6:
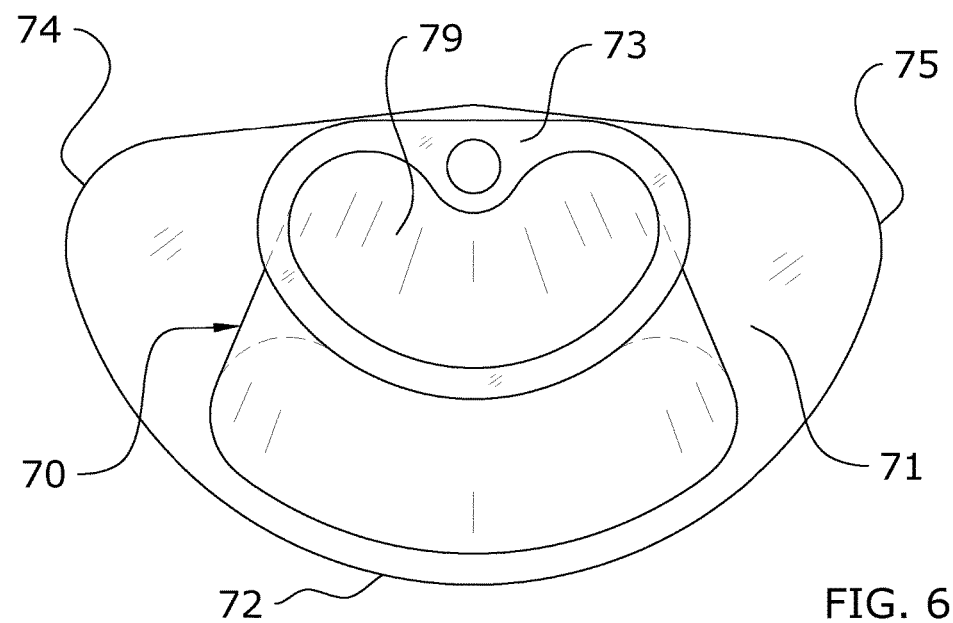
FIG. 6 is a rear view of an alternate embodiment of a diverter valve of a continuous flow pumping system in accordance with an example embodiment.
Figure 7:
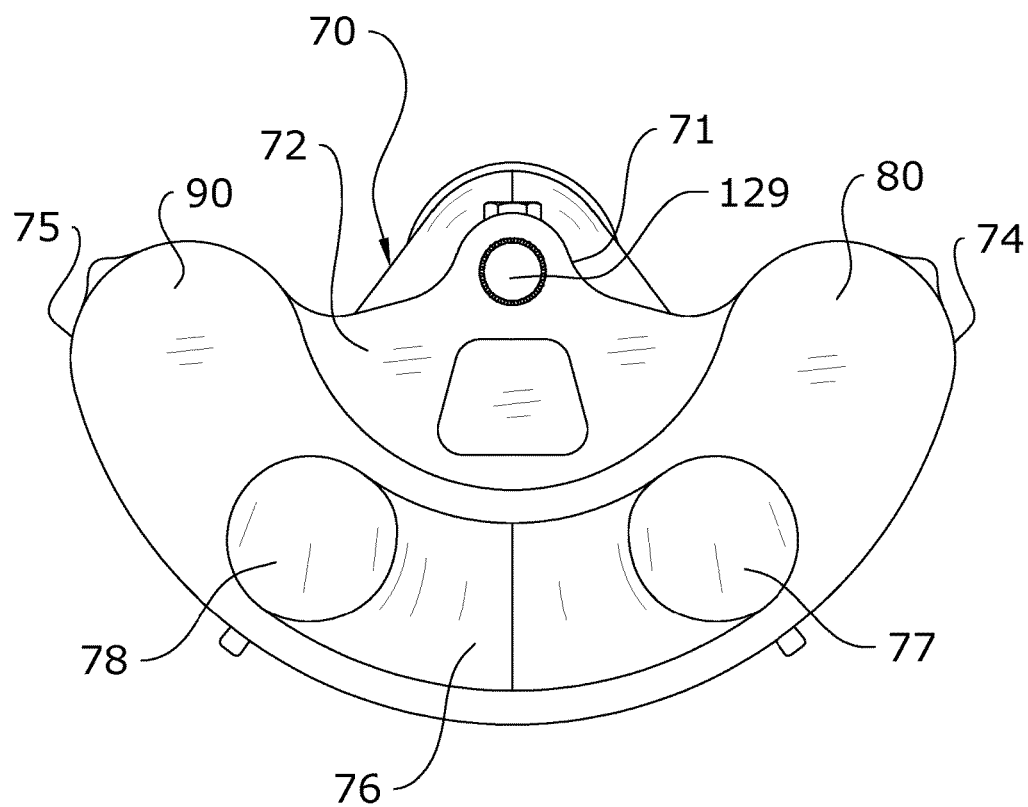
FIG. 7 is a frontal view of a diverter valve of a continuous flow pumping system in accordance with an example embodiment.
Figure 8:
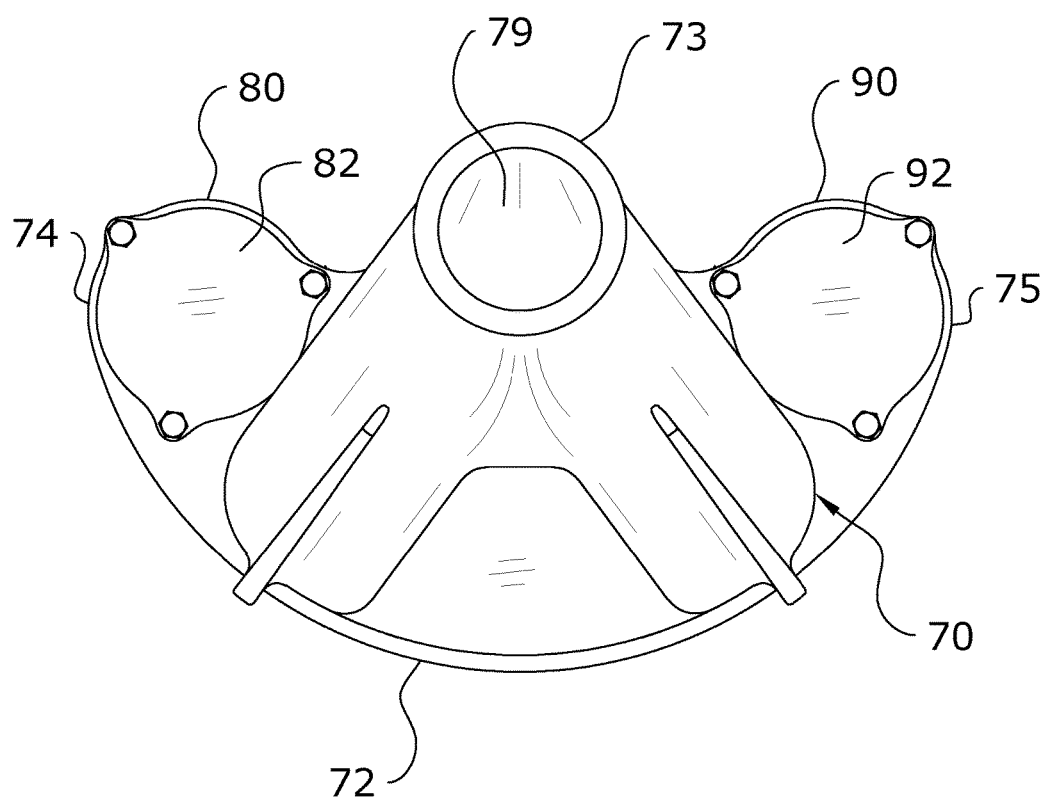
FIG. 8 is a rear view of a diverter valve of a continuous flow pumping system in accordance with an example embodiment.
Figure 9:
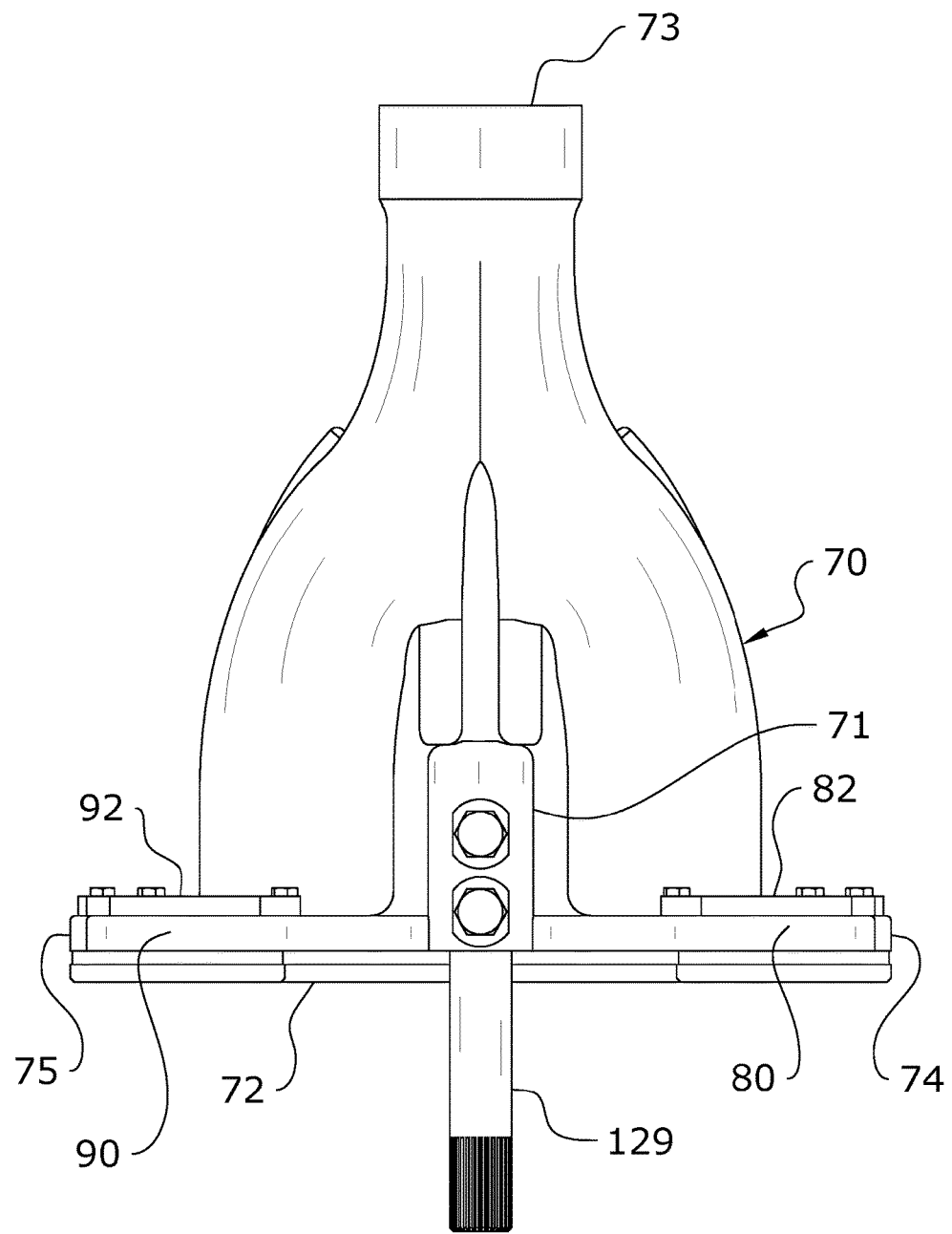
FIG. 9 is a top view of a diverter valve of a continuous flow pumping system in accordance with an example embodiment.
Figure 10:
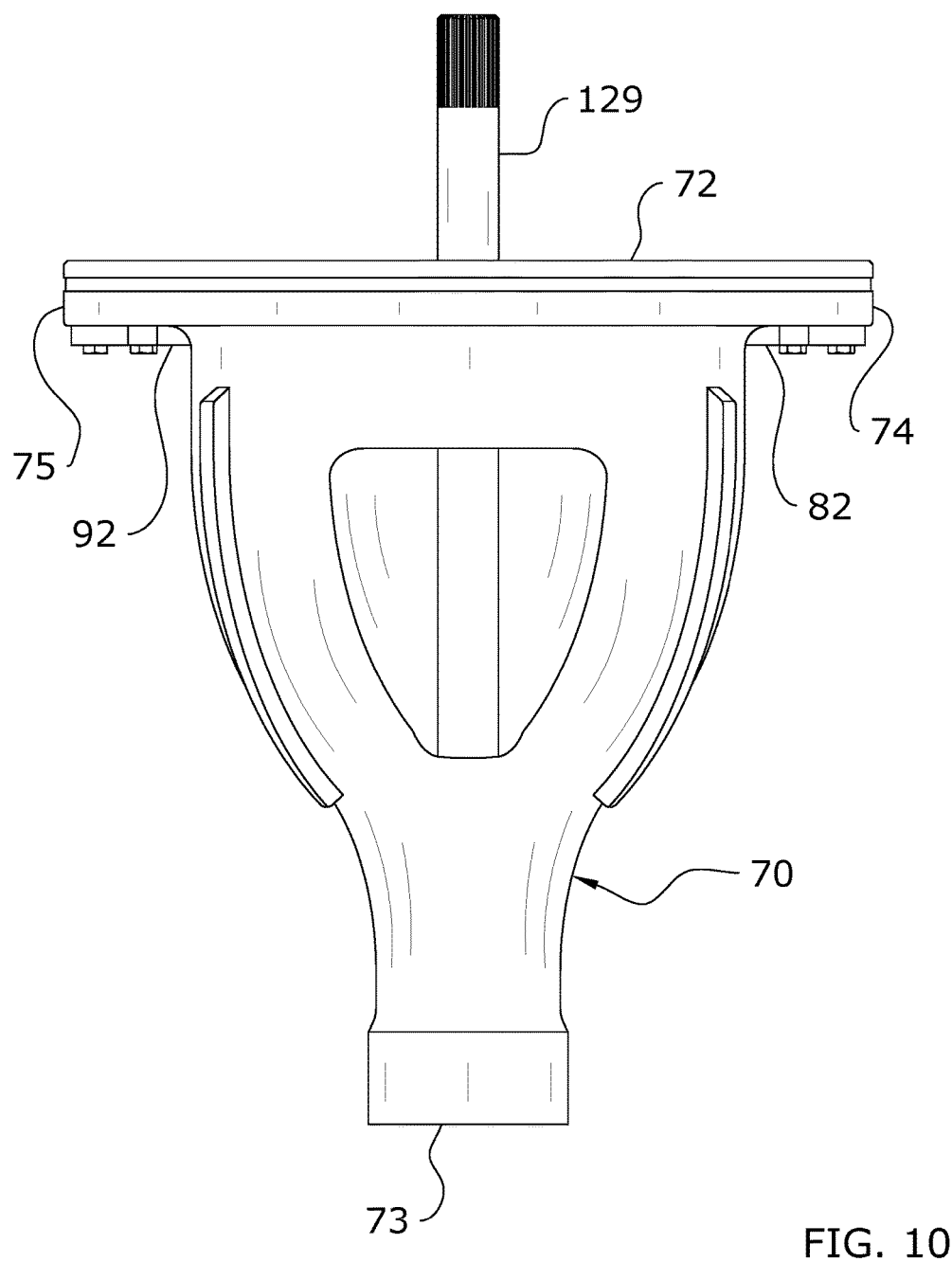
FIG. 10 is a bottom view of a diverter valve of a continuous flow pumping system in accordance with an example embodiment.
Figure 11:
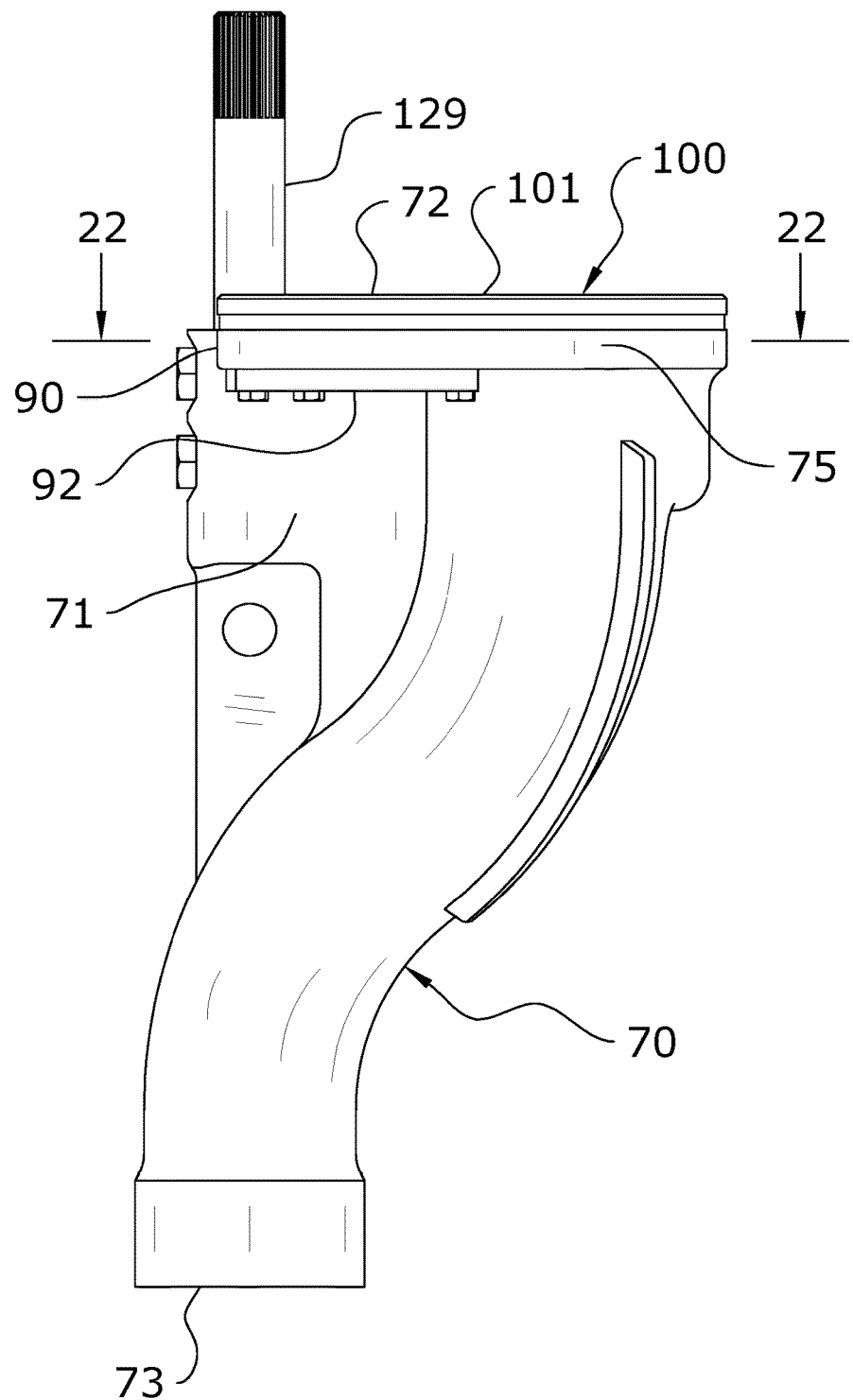
FIG. 11 is a first side view of a diverter valve of a continuous flow pumping system in accordance with an example embodiment.
Figure 12:
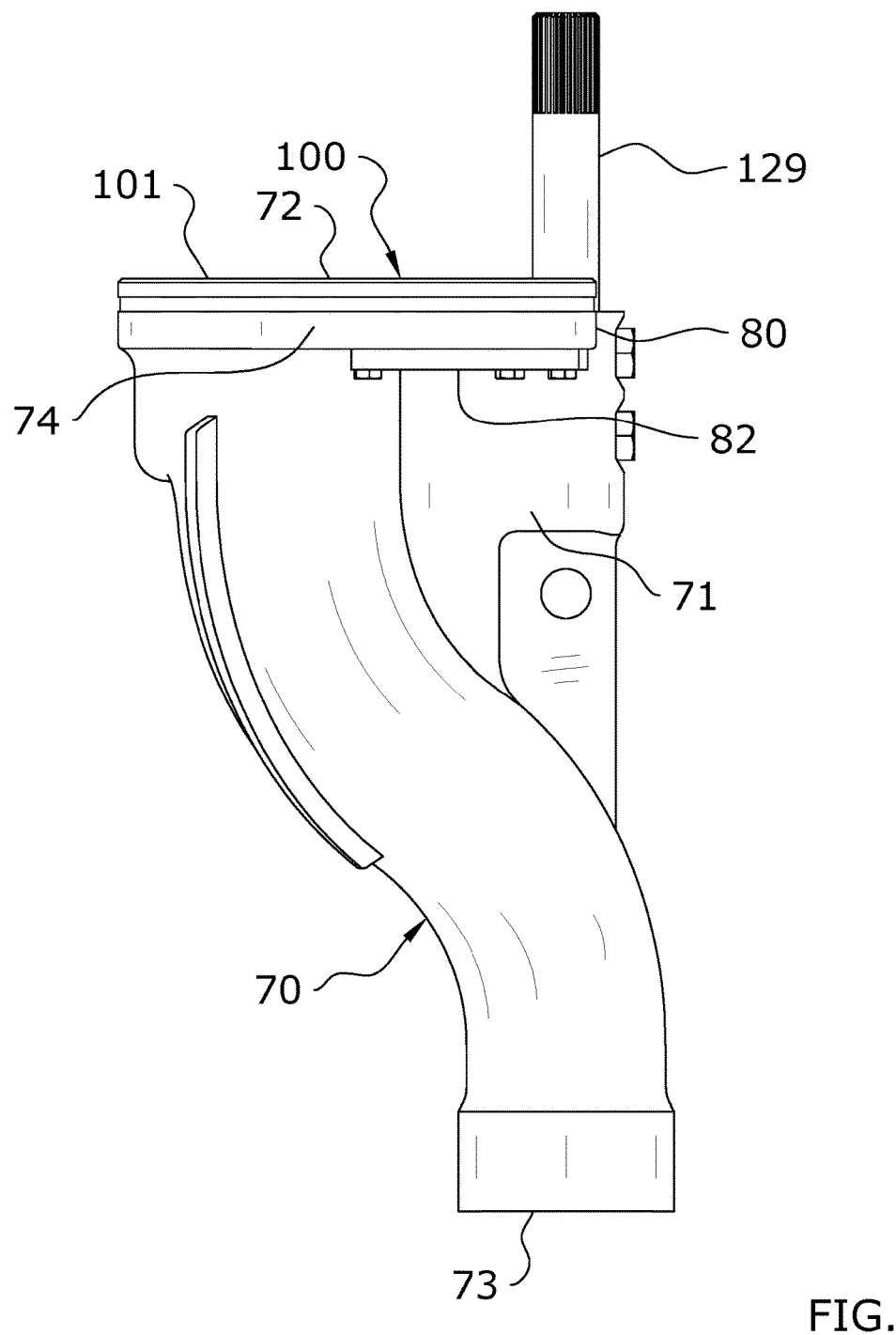
FIG. 12 is a second side view of a diverter valve of a continuous flow pumping system in accordance with an example embodiment.

In the second embodiment of the diverter valve 70 illustrated in FIG. 5, a single channel 77 extends between the valve inlet 76 and the valve outlet 79 through which materials 12 may pass through the diverter valve 70. In the embodiment shown in FIG. 5 the channel 77 comprises a kidney-shaped channel 77 which extends between the valve inlet 76 and the valve outlet 79. As the valve outlet 79 is smaller than the valve inlet 76, the channel 77 may taper inwardly as shown in FIG. 5.

As shown throughout the figures, the diverter valve 70 generally includes a first blocking portion 80 and a second blocking portion 90. The blocking portions 80, 90 of the diverter valve 70 are adapted to selectively cover and seal the transfer openings 34, 35 of the container 20 when the diverter valve 70 is so positioned.

More specifically, depending on the position of the diverter valve 70 in its rotation cycle, the first blocking portion 80 may cover and seal the second transfer opening 35 or the second blocking portion 90 may cover and seal the first transfer opening 34. When one of the transfer openings 34, 35 are so sealed by a blocking portion 80, 90, the inward or outward flow between the relevant cylinder 40, 50 will be stopped, with the flowing materials 12 being blocked by the relevant blocking portion 80, 90.

The shape, structure, size, configuration, and orientation of the blocking portions 80, 90 may vary in different embodiments. In the embodiments shown in the figures, the first blocking portion 80 is on a first side 74 of the diverter valve 70 and the second blocking portion 90 is on a second side 75 of the diverter valve 70. With reference to FIG. 1, the first blocking portion 80 is illustrated as extending outwardly from the main body 71 of the diverter valve 70 at its first side 74. The second blocking portion 90 is illustrated as extending outwardly from the main body 71 of the diverter valve 70 at its second side 75.

The blocking portions 80, 90 may comprise "ear" structures which extend outwardly from the main body 71 of the diverter valve 70. In some embodiments, the blocking portions 80, 90 may be rounded; such as by being circular. Preferably, the blocking portions 80, 90 will be adapted such that they serve an additional function of cutting through any materials 12 as the blocking portions 80, 90 pass over the transfer openings 34, 35 of the container 20.

Figure 15:
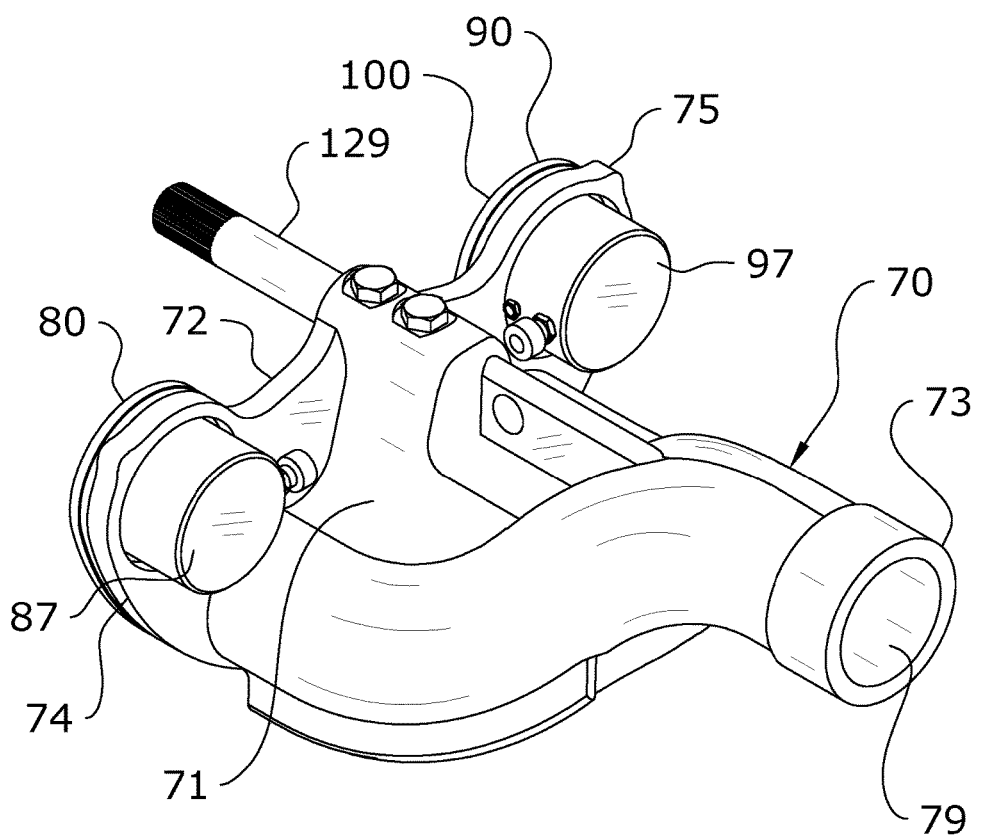
FIG. 15 is a perspective view of a diverter valve with reinforcement actuators of a continuous flow pumping system in accordance with an example embodiment.

Whenever a blocking portion 80, 90 is positioned to seal and block a transfer opening 34, 35 of the container 20, an extreme amount of pressure may be applied against the blocking portion 80, 90. To accommodate for this force of pressure and prevent the seal from breaking or becoming otherwise comprised, the blocking portions 80, 90 may be reinforced with reinforcement inserts 82, 92 as shown in FIG. 13 or reinforcement actuators 87, 97 as shown in FIG. 15.

Figure 13:
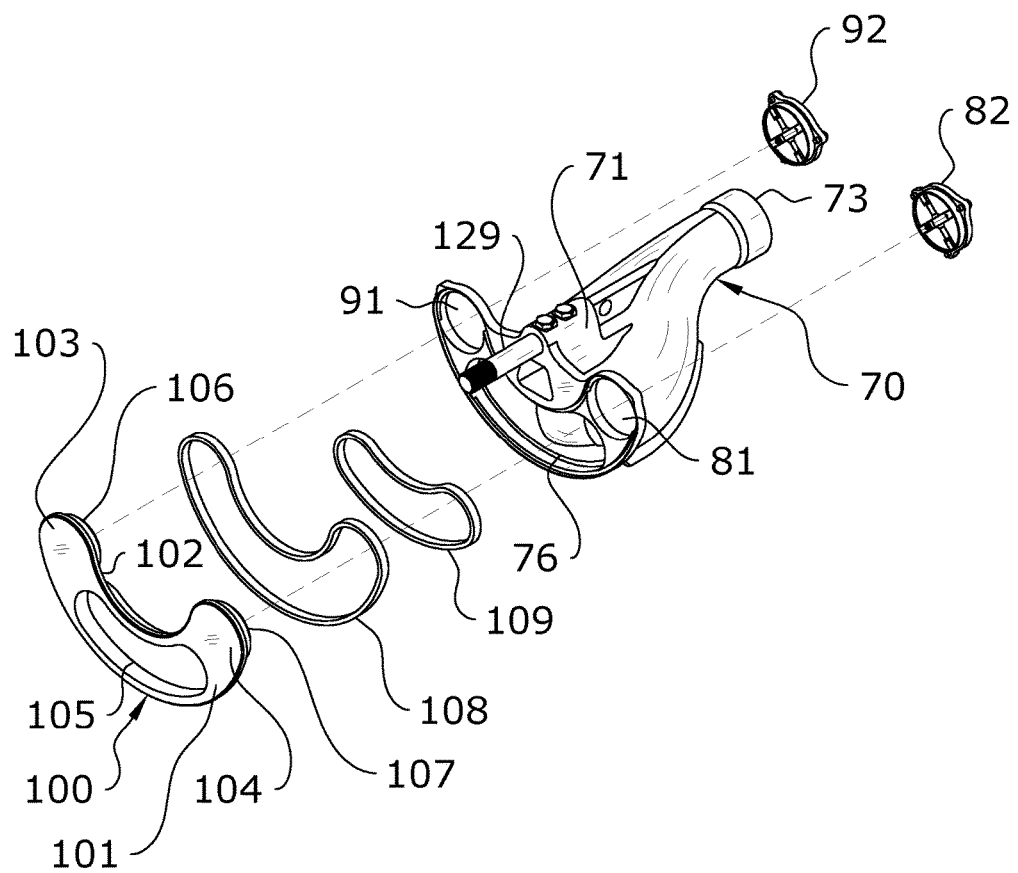
FIG. 13 is an exploded view of a diverter valve of a continuous flow pumping system in accordance with an example embodiment.

In the embodiment shown in FIG. 13, each blocking portion 80, 90 includes a reinforcement insert 82, 92 which activates when that particular blocking portion 80, 90 is sealing a transfer opening 34, 35 under pressure and deactivates when that particular blocking portion 80, 90 is not sealing a transfer opening 34, 35 and thus not under force of pressure.

In such an embodiment shown in FIG. 13, the first blocking portion 80 may comprise a first blocking opening 81 in which the first reinforcement insert 82 is positioned and a second blocking opening 91 in which the second reinforcement insert 92 is positioned. In other embodiments, the reinforcement inserts 82, 92 may be integrally formed with the diverter valve 70 and not separately removable.

As shown in FIG. 13, the first reinforcement insert 82 may include a plurality of first tracks 83a, 83b, 83c, 83d which intersect and terminate at a first central gap 84 in the center of the first reinforcement insert 82. Similarly, the second reinforcement insert 92 may include a plurality of second tracks 93a, 93b, 93c, 93d which intersect and terminate at a second central gap 94 in the center of the second reinforcement insert 92. The central gaps 84, 94 are preferably depressed with respect to the tracks 83a, 83b, 83c, 83d, 93a, 93b, 93c, 93d.

As best shown in FIGS. 17-20, each of the first tracks 83a, 83b, 83c, 83d includes a first reinforcement member 85a, 85b, 85c, 85d and each of the second tracks 93a, 93b, 93c, 93d includes a second reinforcement member 95a, 95b, 95c, 95d. The reinforcement members 85a, 85b, 85c, 85d, 95a, 95b, 95c, 95d will preferably be movably (such as slidably) connected within the respective tracks 83a, 83b, 83c, 83d, 93a, 93b, 93c, 93d. The reinforcement members 85a, 85b, 85c, 85d, 95a, 95b, 95c, 95d may comprise various structures, including the tab structures shown in the figures.

The first reinforcement members 85a, 85b, 85c, 85d are adapted to be retained in the depressed first central gap 84 when the first blocking portion 80 does not cover the second transfer opening 35 and is thus not under pressure. In such a position, the first reinforcement members 85a, 85b, 85c, 85d do not provide any extra reinforcement as they are depressed within the first central gap 84.

Similarly, the second reinforcement members 95a, 95b, 95c, 95d are adapted to be retained in the depressed second central gap 94 when the second blocking portion 90 does not cover the first transfer opening 34 and is thus not under pressure. In such a position, the second reinforcement members 95a, 95b, 95c, 95d do not provide any extra reinforcement as they are depressed within the second central gap 94.

Figure 20:
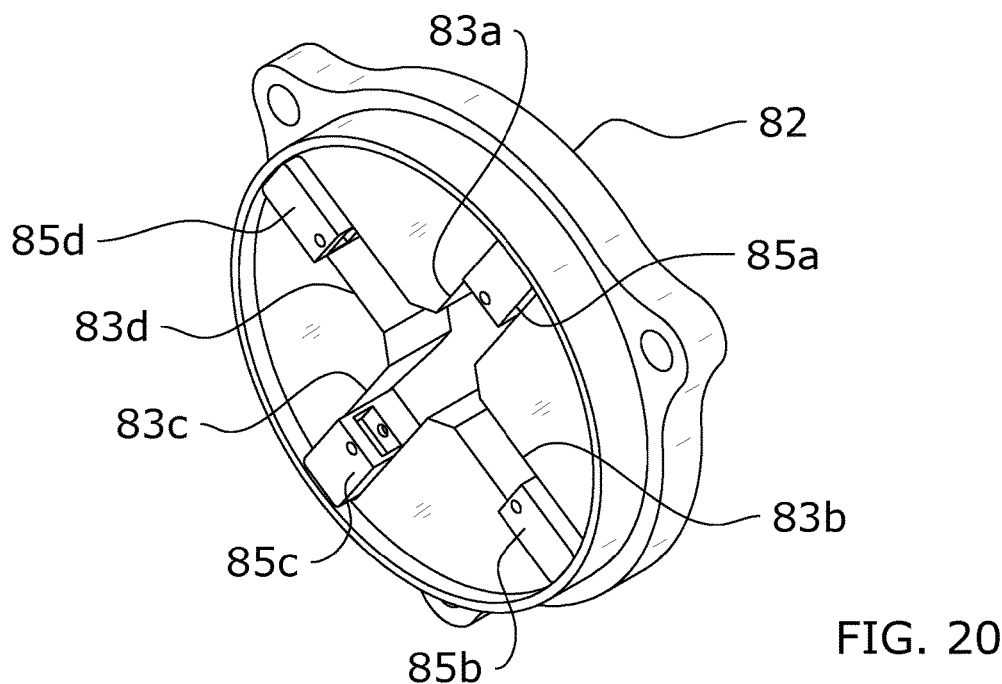
FIG. 20 is a frontal view of a reinforcement insert with reinforcement members in an engaged position of a continuous flow pumping system in accordance with an example embodiment.

When the first blocking portion 80 is rotated to cover and seal the second transfer opening 35, the first reinforcement members 85a, 85b, 85c, 85d are adapted to move along the first tracks 83a, 83b, 83c, 83d outwardly away from the first central gap 84. When so positioned in the first tracks 83a, 83b, 83c, 83d such as shown in FIG. 20, the first reinforcement members 85a, 85b, 85c, 85d provide additional structural reinforcement for the first blocking portion 80 to withstand the increased force of pressure of materials 12 pressing against the first blocking portion 80 without the seal breaking or becoming compromised. As the first blocking portion 80 is rotated away to not cover and seal the second transfer opening 35, the first reinforcement members 85a, 85b, 85c, 85d are adapted to move back along the first tracks 83a, 83b, 83c, 83d inwardly to rest in the first central gap 84.

When the second blocking portion 90 is rotated to cover and seal the first transfer opening 34, the second reinforcement members 95a, 95b, 95c, 95d are adapted to move along the second tracks 93a, 93b, 93c, 93d outwardly away from the second central gap 94. When so positioned in the first tracks 93a, 93b, 93c, 93d such as shown in FIG. 20, the second reinforcement members 95a, 95b, 95c, 95d provide additional structural reinforcement for the second blocking portion 90 to withstand the increased force of pressure of materials 12 pressing against the second blocking portion 90 without the seal breaking or becoming compromised. As the second blocking portion 90 is rotated away to not cover and seal the first transfer opening 34, the second reinforcement members 95a, 95b, 95c, 95d are adapted to move back along the second tracks 93a, 93b, 93c, 93d inwardly to rest in the second central gap 94.

The manner in which the reinforcement members 85a, 85b, 85c, 85d, 95a, 95b, 95c, 95d are adjusted to move along the tracks 83a, 83b, 83c, 83d, 93a, 93b, 93c, 93d may vary in different embodiments. One exemplary method of moving the reinforcement members 85a, 85b, 85c, 85d, 95a, 95b, 95c, 95d may comprise actuators or the like which are adapted to push or pull the reinforcement members 85a, 85b, 85c, 85d, 95a, 95b, 95c, 95d along the tracks 83a, 83b, 83c, 83d, 93a, 93b, 93c, 93d.

Figure 16:
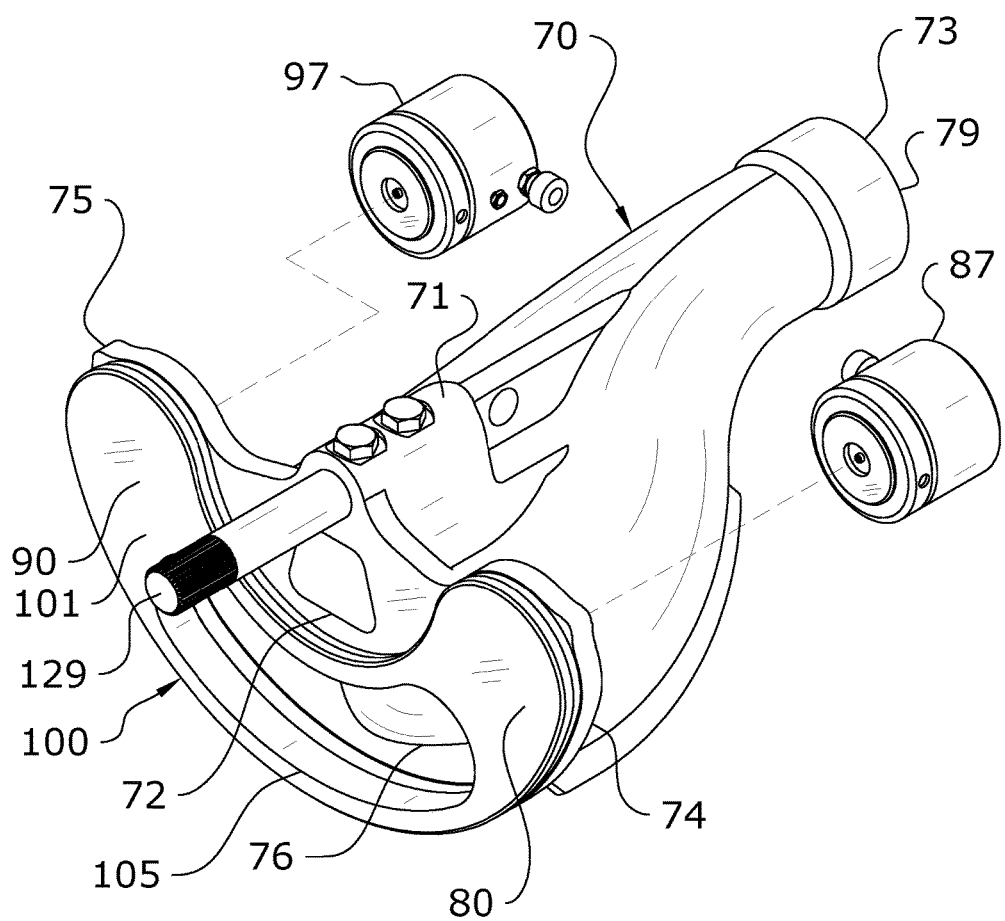
FIG. 16 is a perspective view of a diverter valve with reinforcement actuators of a continuous flow pumping system in accordance with an example embodiment.
Figure 17:
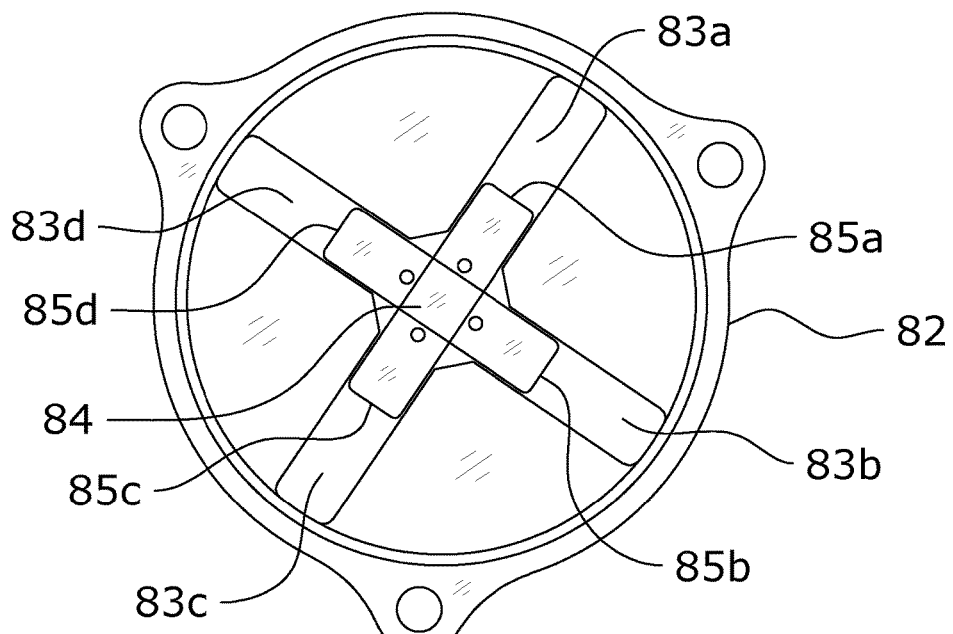
FIG. 17 is a frontal view of a reinforcement insert with reinforcement members in a resting position of a continuous flow pumping system in accordance with an example embodiment.
Figure 18:
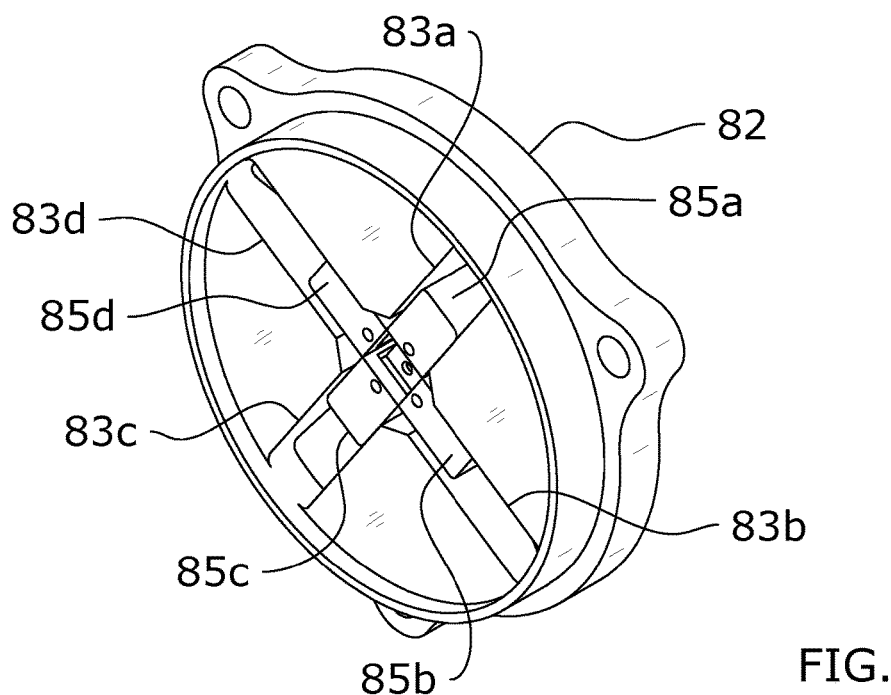
FIG. 18 is a frontal view of a reinforcement insert with reinforcement members in a resting position of a continuous flow pumping system in accordance with an example embodiment.
Figure 19:
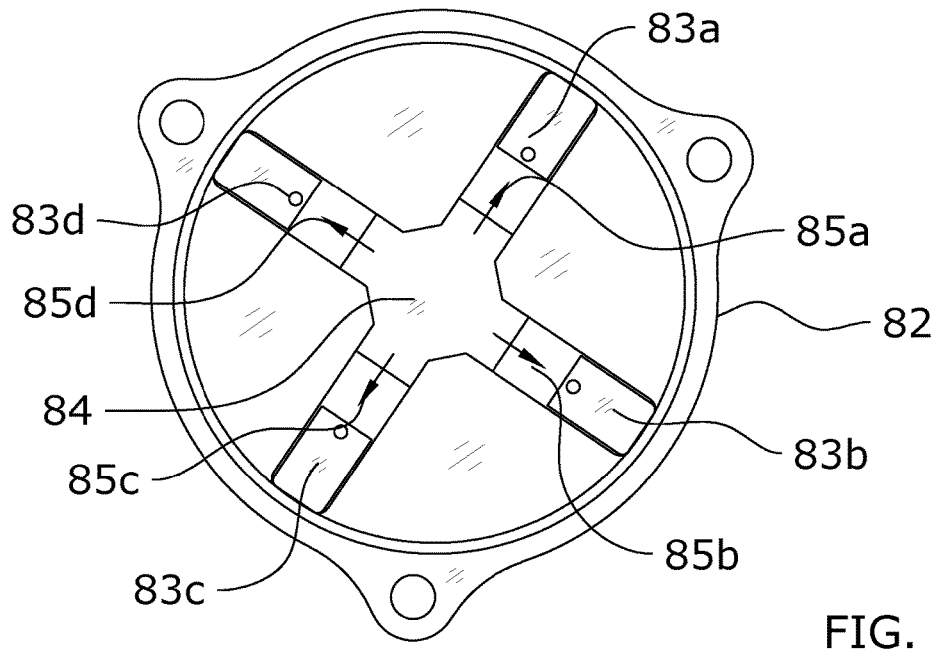
FIG. 19 is a frontal view of a reinforcement insert with reinforcement members in an engaged position of a continuous flow pumping system in accordance with an example embodiment.

An alternate reinforcement system for the blocking portions 80, 90 is shown in FIG. 16. In such an embodiment, reinforcement actuators 87, 97 are provided which extend when reinforcement is needed and retract when reinforcement is not needed. In the exemplary embodiment shown in FIG. 16, a first reinforcement actuator 87 is connected behind the first blocking portion 80 and a second reinforcement actuator 97 is connected behind the second blocking portion 90.

The first reinforcement actuator 87 is adapted to extend to exert pressure and provide reinforcement against the back end of the first blocking portion 80 and the second reinforcement actuator 97 is adapted to extend to exert pressure and provide reinforcement against the back end of the second blocking portion 90.

More specifically, the first reinforcement actuator 87 is adapted to extend when the first blocking portion 80 covers the second transfer opening 35 and the second reinforcement actuator 97 is adapted to extend when the second blocking portion 90 covers the first transfer opening 34. When so extended, the reinforcement actuators 87, 97 exert counter pressure to counteract the pressure of the materials 12 being forced against the relevant blocking portion 80, 90.

Conversely, the first reinforcement actuator 87 is adapted to retract when the first blocking portion 80 does not cover the second transfer opening 35 and the second reinforcement actuator 97 is adapted to retract when the second blocking portion 90 does not cover the first transfer opening 34; as no reinforcement pressure is necessary when the diverter valve 70 is so positioned that the blocking portions 80, 90 do not cover the transfer openings 34, 35.

It is important to the functionality of the continuous flow pumping system 10 that seating be maintained between the diverter valve 70 and the container 20 so as to prevent breaks in the seals or other negative effects on the operation of the continuous flow pumping system 10. To provide constant pressure and maintain the seating, bias members 108, 109 may be utilized which bias the diverter valve 70 toward the container 20.

FIG. 13 illustrates the usage of bias members 108, 109 positioned between a diverter face place plate 100 and the main body 71 of the diverter valve 70. In such an embodiment, a diverter face plate 100 may be connected to the main body 71 of the diverter valve 70; with the bias members 108, 109 between the diverter face plate 100 and the main body 71 of the diverter valve 70 to bias the diverter face plate 100 against the container 20 and thus maintain seating between the diverter valve 70 and the container 20.

In such an embodiment as shown in FIG. 13, the diverter face plate 100 will generally comprise a first end 101 which faces away from the main body 71 of the diverter valve 70 and a second end 102 which faces toward the main body 71 of the diverter valve 70. The shape and size of the diverter face plate 100 may comprise the same shape and size (such as kidney-shaped) to match the first end 72 of the diverter valve's 70 main body 71; with the first side 103 of the diverter face plate 100 being flush with the first side 74 of the diverter valve 70 and the second side 104 of the diverter face plate 100 being flush with the second side 75 of the diverter valve 70.

As shown in FIG. 13, the diverter face plate 100 may include a first blocking receiver 106 comprising a ring-shaped member adapted to engage with and receive the first reinforcement insert 82 and a second blocking receiver 107 comprising a ring-shaped member adapted to engage with and receive the second reinforcement insert 92. The blocking receivers 106, 107 will generally extend from the second end 102 of the diverter face plate 100; with the first blocking receiver 106 being positioned at or near the first side 103 of the diverter face plate 100 and the second blocking receiver 107 being positioned at or near the second side 104 of the diverter face plate 100.

The diverter face plate 100 will preferably include a face plate opening 105 which is the same shape and size as the valve inlet 76 of the diverter valve 70. The face plate opening 105 is positioned over the face plate opening 105 so that materials 12 may flow freely through the valve inlet 76 and face plate opening 105.

As shown in FIG. 13, one or more bias members 108, 109 may be connected between the main body 71 and the diverter face plate 100. The bias members 108, 109 are biased toward the diverter face plate 100 to retain seating of the diverter valve 70 against the container 20 along all rotational positions of the diverter valve 70.

The shape, type, size, and configuration of the bias members 108, 109 may vary in different embodiments. In the exemplary embodiment of FIG. 13, a first bias member 108 is connected between the main body 71 and the diverter face plate 100 of the diverter valve 70; with the first bias member 108 extending along an outer circumference of the diverter face plate 100. Similarly, a second bias member 109 is connected between the main body 71 and the diverter face plate 100 of the diverter valve 70; with the second bias member 109 extending along an outer circumference of the valve inlet 76. Thus, in this embodiment, the first bias member 108 comprises a shape and size similar to that of the diverter face plate 100 and the second bias member 109 comprises a shape and size similar to that of the valve inlet 76 of the diverter valve 70.

Various types of bias members 108, 109 may be utilized. In the preferred embodiment shown in the figures, both the first bias member 108 and the second bias member 109 comprise loops of a resilient material such as rubber. Other materials may be utilized and the bias members 108, 109 need not necessarily comprise loops in some embodiments.

The continuous flow pumping system 10 may include a guide member 60 along which the diverter valve 70 rotates through its plurality of positions. The guide member 60 is preferably connected to the container 20, with the diverter valve 70 being rotatably connected to the guide member 60 such that the diverter valve 70 rotates along the guide member 60.

The guide member 60 may provide wear protection for the container 20 by ensuring that any frictional contact is between the diverter valve 70 and the guide member 60; rather than the diverter valve 70 and the container 20. This will ensure that only the guide member 60 need to be periodically replaced due to wear; rather than the entire container 20.

As shown in FIG. 22*a*-22*e*, the guide member 60 may be connected to the inner wall 23 of the first end 21 of the container 20. The guide member 60 preferably includes guide transfer openings 65*a*, 65*b* which are fluidly connected with the transfer openings 34, 35 of the container 20. More specifically, a first guide transfer opening 65*a* is fluidly connected with the first transfer opening 34 and a second guide transfer opening 65*b* is fluidly connected with the second transfer opening 35.

Figure 14A:
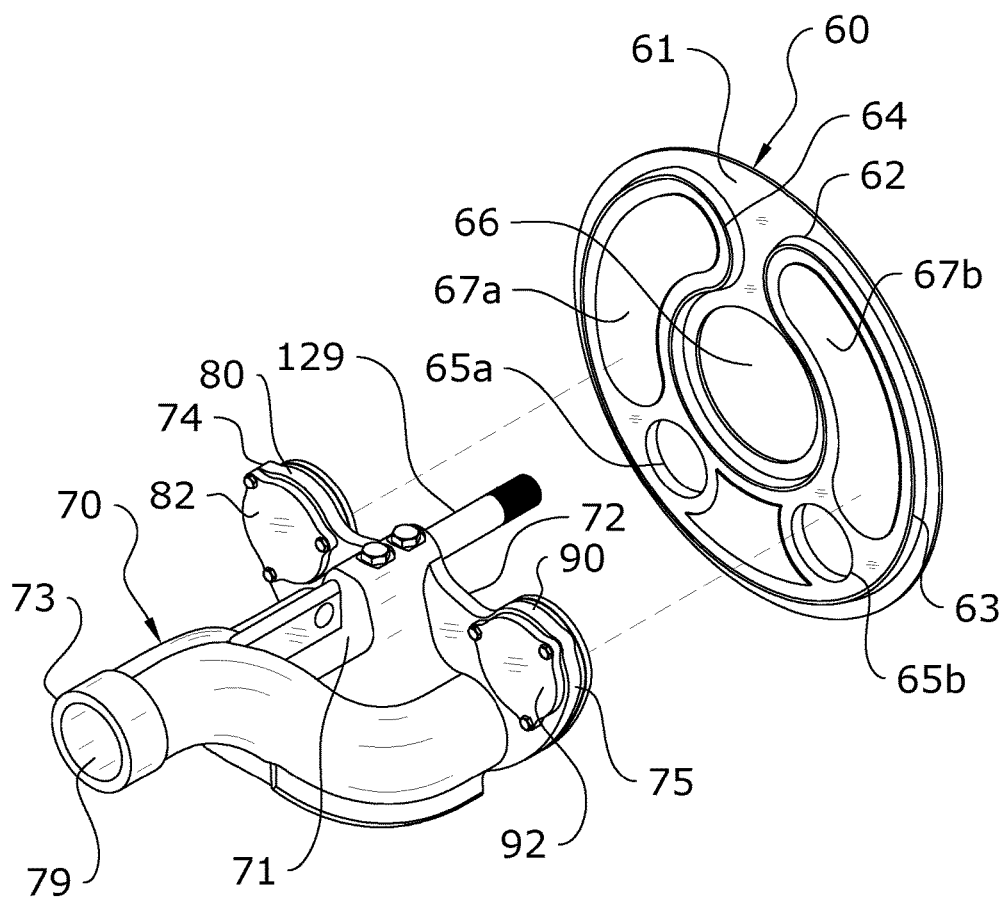
FIG. 14a is a perspective view of a diverter valve and guide member of a continuous flow pumping system in accordance with an example embodiment.
Figure 14B:
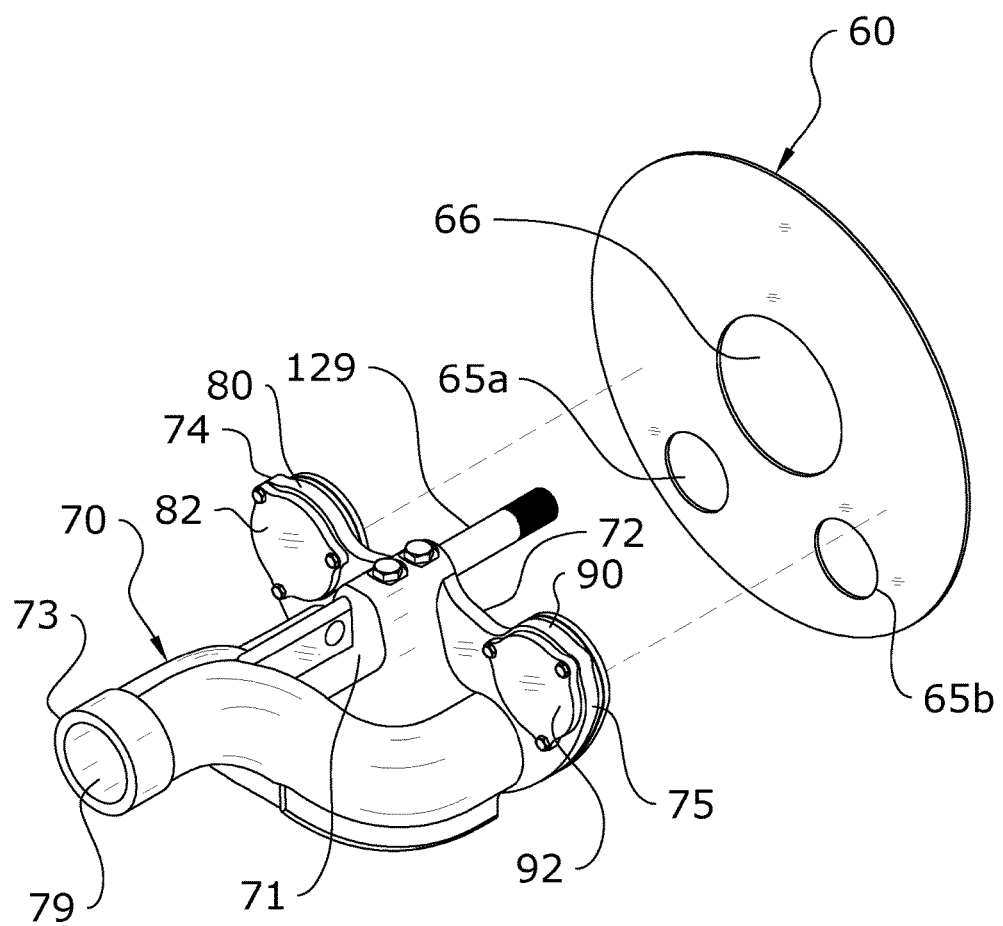
FIG. 14b is a perspective view of a diverter valve and alternate guide member of a continuous flow pumping system in accordance with an example embodiment.

The shape, size, and configuration of the guide member 60 may vary in different embodiments. The guide member 60 may be secured to the container 20 in various manners, such as welding on the like. Generally, the guide member 60 will include a base 61 which is secured to the inner wall 23 of the container 20. The base 61 may include a raised portion 62 which engages with the diverter valve 70 and around which the diverter valve 70 rotates as shown in FIG. 14*a*. In other embodiments, the guide member 60 may omit such raised portions and merely comprise a wear plate configuration such as shown in FIG. 14*b*. The raised portion 62 may include an outer flange 63 and an inner flange 64 as shown in FIG. 14*a*.

The guide member 60 may also include a central opening 66 through which the pivot connector 129 may extend and rotate as shown in both FIGS. 14*a* and 14*b*. Additionally in some embodiments the guide member 60 may include outer portions 67*a*, 67*b* matching the shape and size of the valve inlet 76. These outer portions 67*a*, 67*b* in some embodiments need not be reinforced; while in other embodiments the entirety of the guide member 60 may be reinforced. FIG. 14*a* illustrates a first outer portion 67*a* and a second outer portion 67*b*.

E. Rotator Assembly

As shown throughout the figures, the diverter valve 70 is rotated between a plurality of positions with respect to the container 20. The manner in which the diverter valve 70 is rotated between its various positions may vary in different embodiments of the continuous flow pumping system 10. Thus, the following description and accompanying figures should not be construed as limiting on the scope of the manner by which the diverter valve 70 is rotated between its various positions.

In the exemplary embodiment shown in the figures, a rotator assembly 120 is connected between the container 20 and the diverter valve 70 for rotating the diverter valve 70 between a plurality of positions. As best shown in FIGS. 23*a*-23*c* and 24*a*-24*c*, the rotator assembly 120 may comprise a first connector 121, a first rotator actuator 122, a second connector 125, and a second rotator actuator 126. FIGS. 24*a*-24*c* illustrate an alternate embodiment in which the first connector 121 is elongated and the first rotator actuator 122 is connected to a mid-point on the first connector 121 rather than its distal end.

The first and second connectors 121, 125 may comprise elongated members, such as levers or the like, which are connected to the pivot connector 129 of the diverter valve 70 in such a manner that movement of the connectors 121, 125 will cause rotation of the diverter valve 70. The first rotator actuator 122 comprises a first rotator shaft 123 which is connected to the first connector 121 and the second rotator actuator 126 comprises a second rotator shaft 127 which is connected to the second connector 125.

The manner in which the rotator actuators 122, 126 are secured may vary in different embodiments. The first rotator actuator 122 may include a first rotator trunnion mount 124 and the second rotator actuator 126 may include a second rotator trunnion mount 128; with a separate bracket (not shown) connecting between the trunnion mounts 122, 128 and the container 20 to mount the rotator actuators 122, 126.

Broadly speaking, the first connector 121 is connected between the first rotator actuator 122 and the diverter valve 70; with the first rotator actuator 122 being adapted to rotate the first connector 121 and diverter valve 70. The second connector 125 is rotatably connected to the first connector 121 and also connected to the diverter valve 70 such that movement of the second connector 125 will rotate the diverter valve 70. The second rotator actuator 126 is connected to the second connector 125 such that the second rotator actuator 126 is adapted to rotate both the second connector 125 and the diverter valve 70.

Figure 23A:
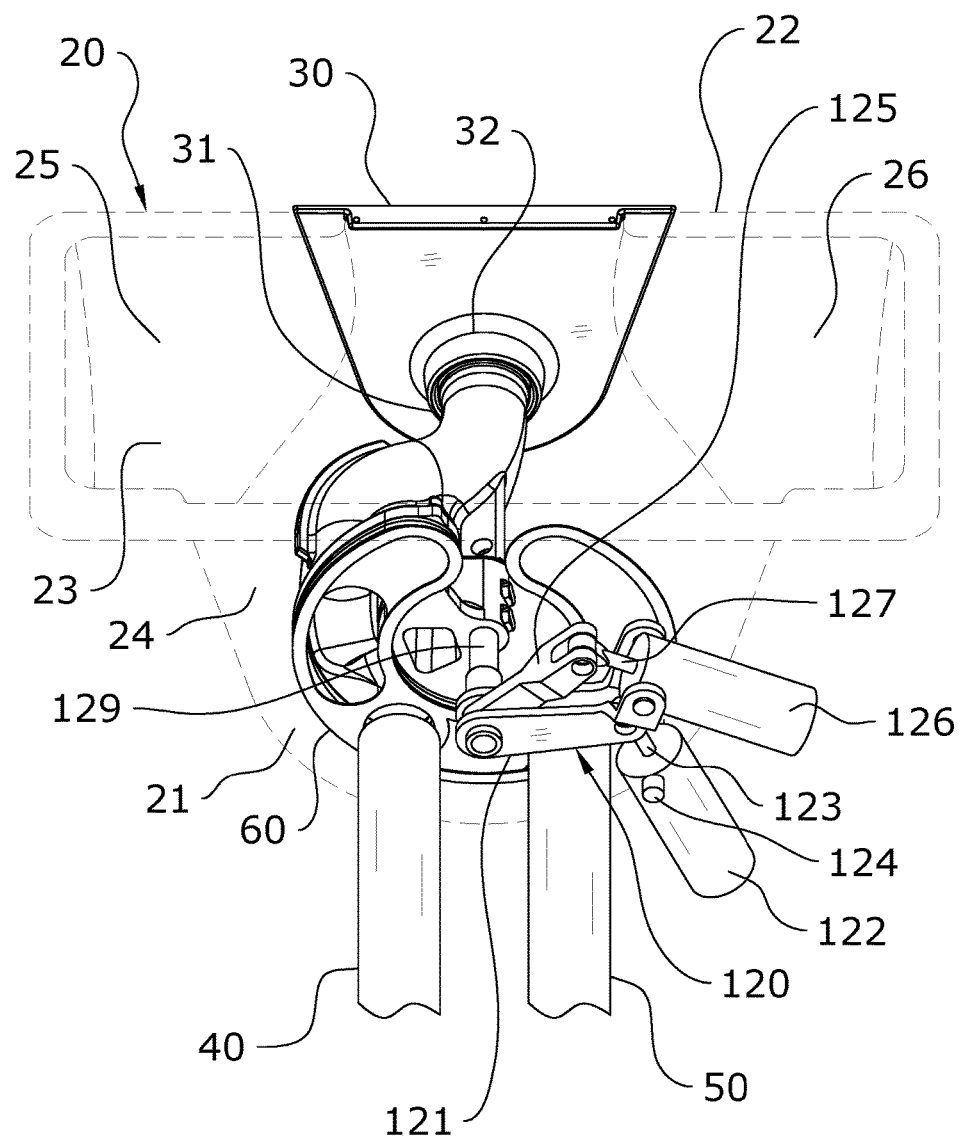
FIG. 23a is a perspective view illustrating adjustment of the rotator assembly of a continuous flow pumping system in accordance with an example embodiment.
Figure 23B:
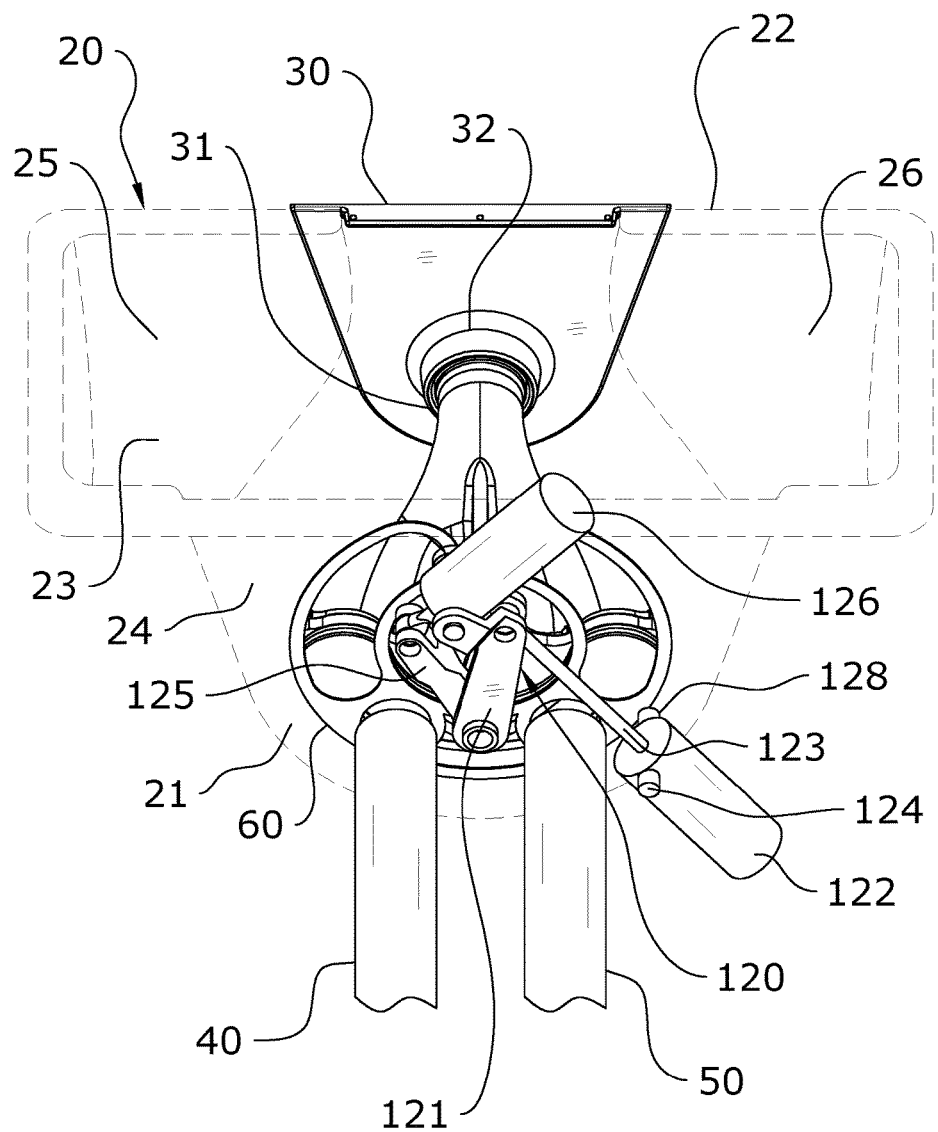
FIG. 23b is a perspective view illustrating adjustment of the rotator assembly of a continuous flow pumping system in accordance with an example embodiment.
Figure 23C:
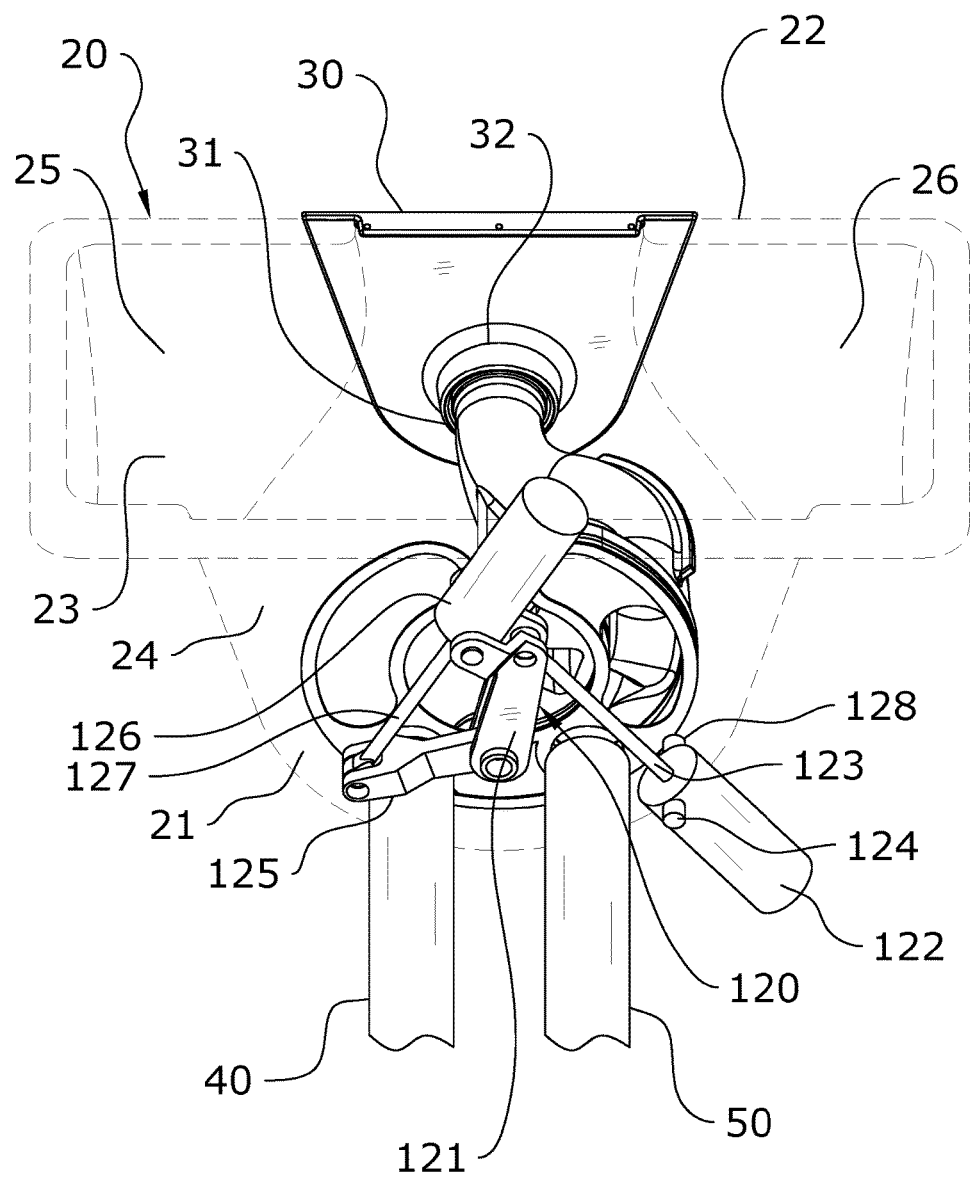
FIG. 23c is a perspective view illustrating adjustment of the rotator assembly of a continuous flow pumping system in accordance with an example embodiment.
Figure 24A:
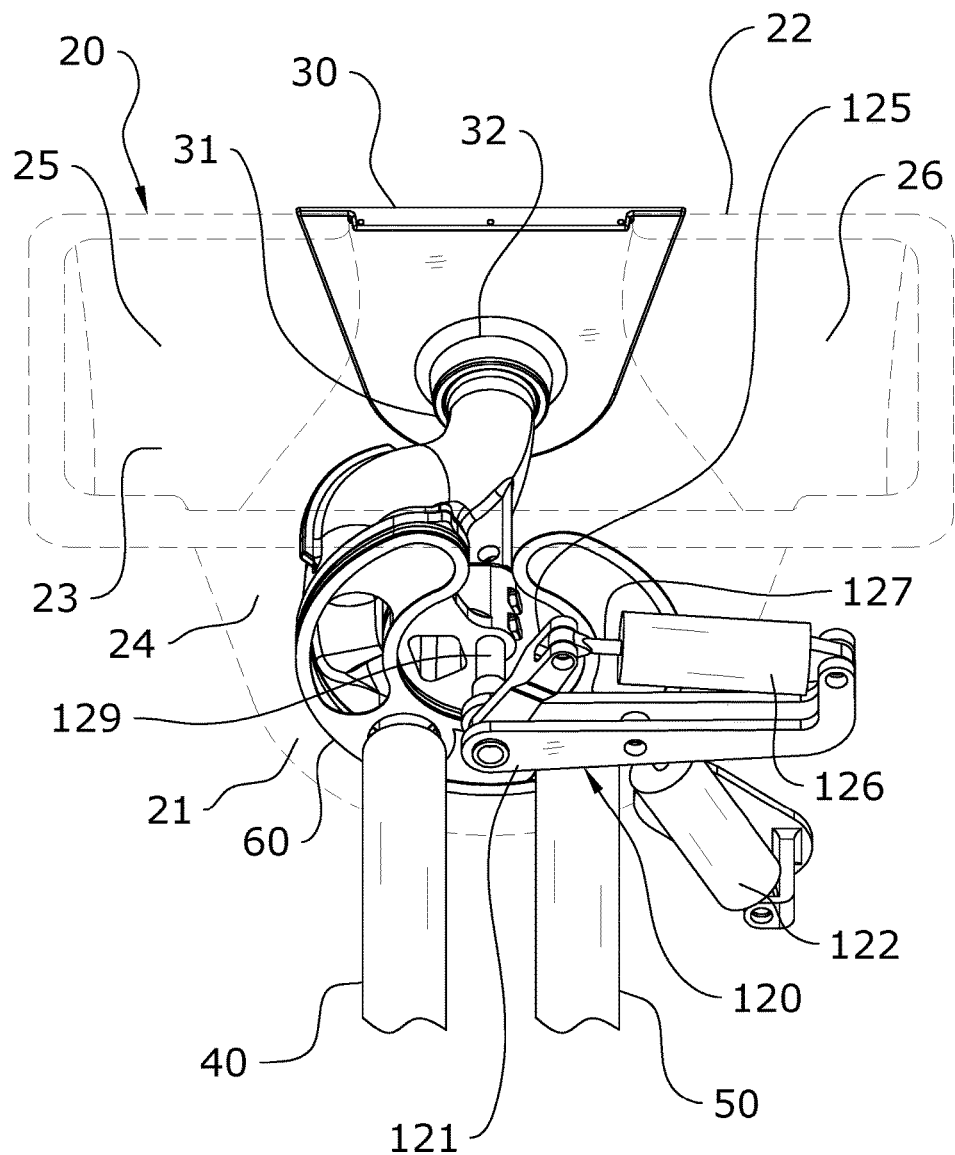
FIG. 24a is a perspective view illustrating adjustment of an alternate rotator assembly of a continuous flow pumping system in accordance with an example embodiment.
Figure 24B:
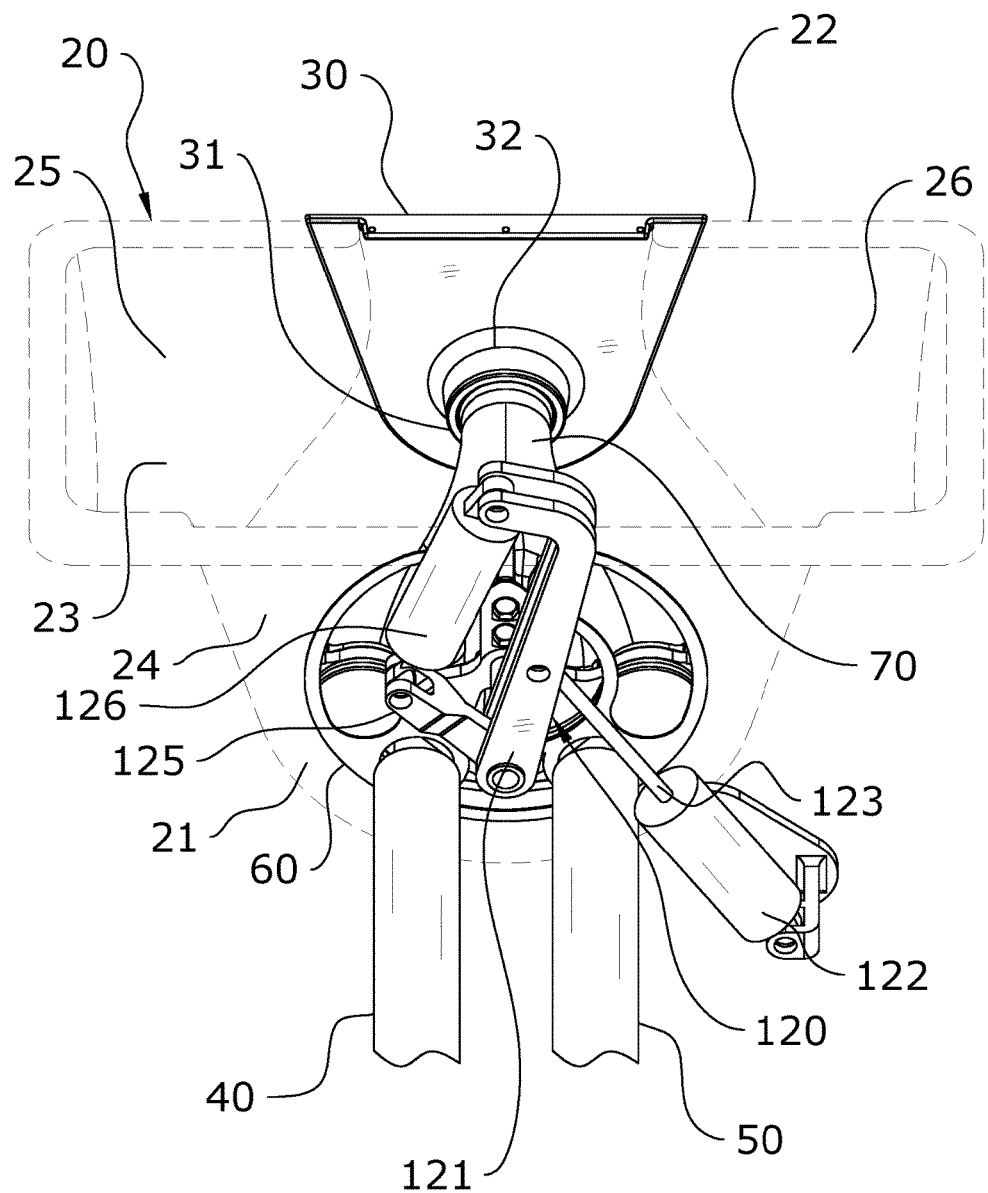
FIG. 24b is a perspective view illustrating adjustment of an alternate rotator assembly of a continuous flow pumping system in accordance with an example embodiment.
Figure 24C:
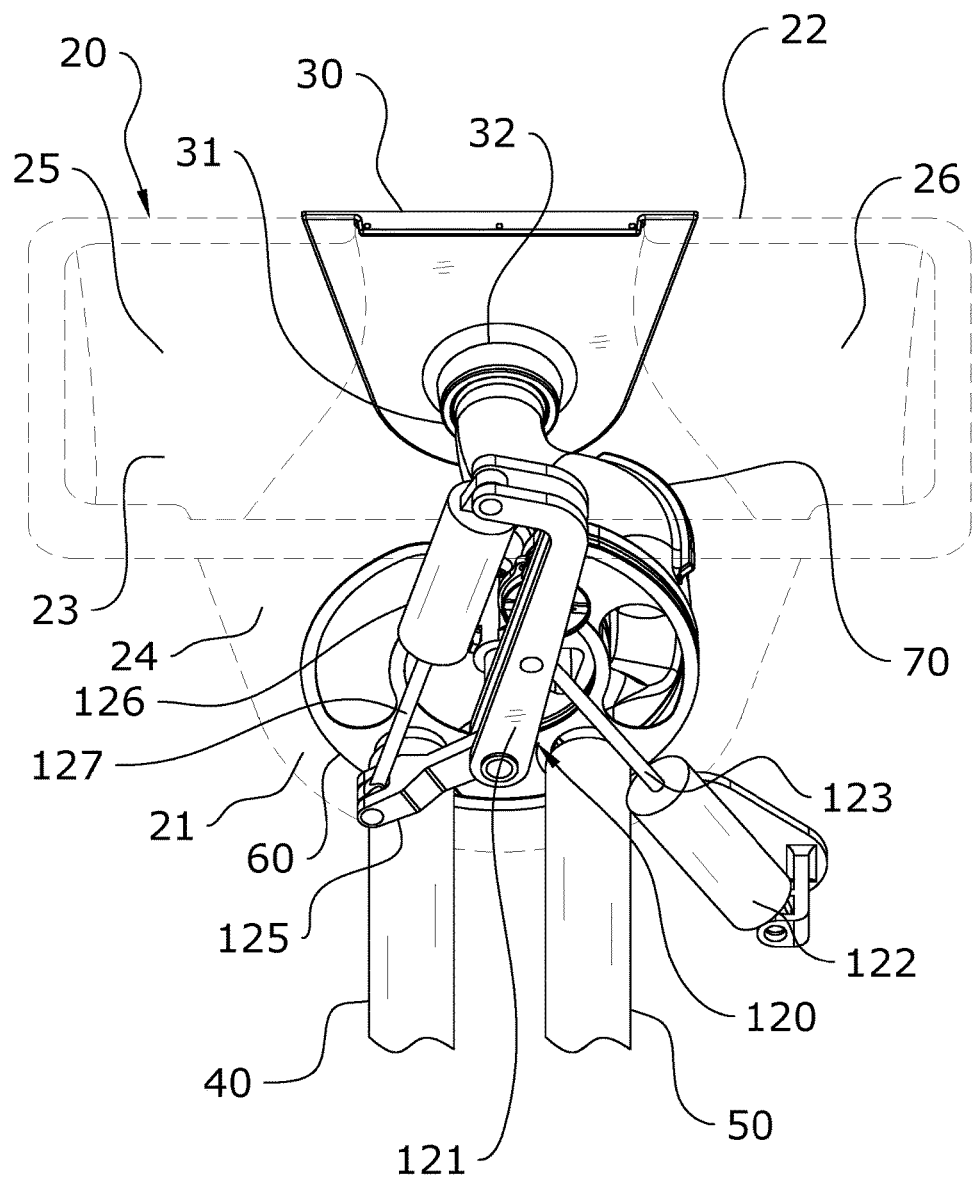
FIG. 24c is a perspective view illustrating adjustment of an alternate rotator assembly of a continuous flow pumping system in accordance with an example embodiment.

FIGS. 23*a*-23*c* illustrate an exemplary series of movements of the connectors 121, 125 and rotator actuators 122, 126 to effectuate a full rotation of the diverter valve 70 between its various positions. In FIG. 23*a*, both of the rotator actuators 122, 126 are retracted; with the diverter valve 70 being rotated fully toward the first side of the container 20. In FIG. 23*b*, the first rotator actuator 122 has been extended to rotate both the first connector 121 and the diverter valve 70. In this position, the diverter valve 70 has rotated toward the second side of the container 20. In FIG. 23*c*, the second rotator actuator 126 has been extended to rotate both the second connector 125 and the diverter valve 70. In this position, the diverter valve 70 is rotated fully toward the second side of the container 20. Reversing these steps will rotate the diverter valve 70 back to its original position toward the first side of the container 20.

F. Cylinder Actuator Assembly

As shown throughout the figures, the cylinders 40, 50 are independently controlled to produce a continuous flow of materials 12 out of the container 20. A wide range of systems may be utilized to control the cylinders 40, 50, such as the strokes of the pistons 43, 53. On an intake stroke, the pistons 43, 53 will draw materials from the container 20 into the cylinders 40, 50 and on the exhaust stroke, the pistons 43, 53 will push materials from the cylinders 40, 50 through the diverter valve 70 and out of the outlet opening 32 of the container 20. The pistons 43, 53 are individually controlled and monitored to maintain the constant flow of materials 12.

To control operation of the cylinders 40, 50, a control assembly 130 may be utilized. The control assembly 130 will control the flow of hydraulic fluids to and from the cylinder actuators 41, 51 to effectuate the constant flow of materials 12 out of the container 20.

The configuration of the control assembly 130 may vary in different embodiments but will generally include a plurality of conduits 131 for transferring hydraulic fluids and/or electronic signals, a tank 132 for storing hydraulic fluids, a cooler 133, a plurality of pumps 134 for pumping the hydraulic fluids through the conduits 131, a plurality of valves 135a, 135b, 135c, 135d for controlling flow of hydraulic fluids, a plurality of accumulators 136a, 136b, and a central controller 137 for controlling the overall control assembly 130.

Figure 29:
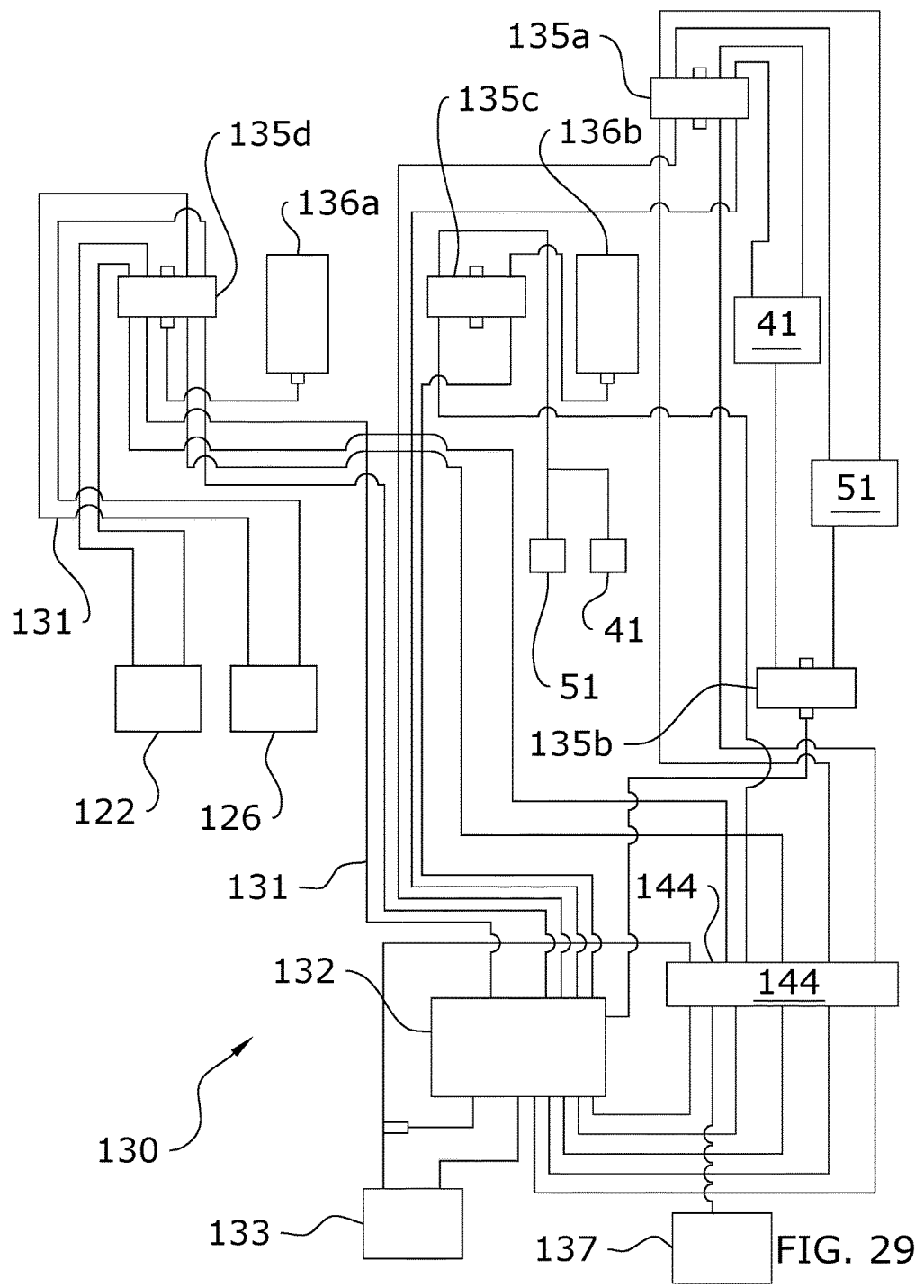
FIG. 29 is a block diagram of a first embodiment of a control assembly of a continuous flow pumping system in accordance with an example embodiment.

An exemplary embodiment of a control assembly 130 is shown in FIG. 29 which controls actuation of both the cylinders 40, 50 and the rotator assembly 120. In this embodiment, a first set of valves 135a functions as a proportional directional valve that is connected via conduits 131 to each cylinder 40, 50, such as via the cylinder piston ports 46, 56. These first valves 135a control the flow rate of hydraulic fluids into or out of the cylinders 40, 50. These first valves 135a also control virtually all motion of the respective cylinders 40, 50 with the exception of a phase of the retraction cycle for each cylinder 40, 50.

A set of second valves 135b comprising one-way valves are connected to each cylinder 40, 50 to control retraction of the respective cylinder 40, 50. These second valves 135b may comprise proportional directional valves to provide the returning hydraulic fluids a direct path to the tank 132 to allow each cylinder 40, 50 to efficiently retract faster than the discharge rate. Each of the second valves 135b are controlled independently and will close at the set position wherein the retract cycle begins to decelerate; allowing the first valves 135a to control the halt of the respective cylinder 40, 50.

A third valve 135c comprises a directional valve to divert the hydraulic fluid in three positions. First, it can tie the circuit to direct flow to an accumulator 136b. Second, it can divert flow to return to the tank 132. Finally, it can provide overall pressure to the circuit when needed for continuous flow of materials 12.

FIG. 29 illustrates a pair of accumulators 136a, 136b being used. The first accumulator 136a may be connected to the fourth valves 135d to operate the rotator assembly 120; with each of the fourth valves 135d comprising a directional valve connected to a respective cylinder 40, 50. The second accumulator 136b may be linked with the same circuit as the third valve 135c to control operation of the cylinders 40, 50 as shown in FIG. 29 and described below.

Figure 30:
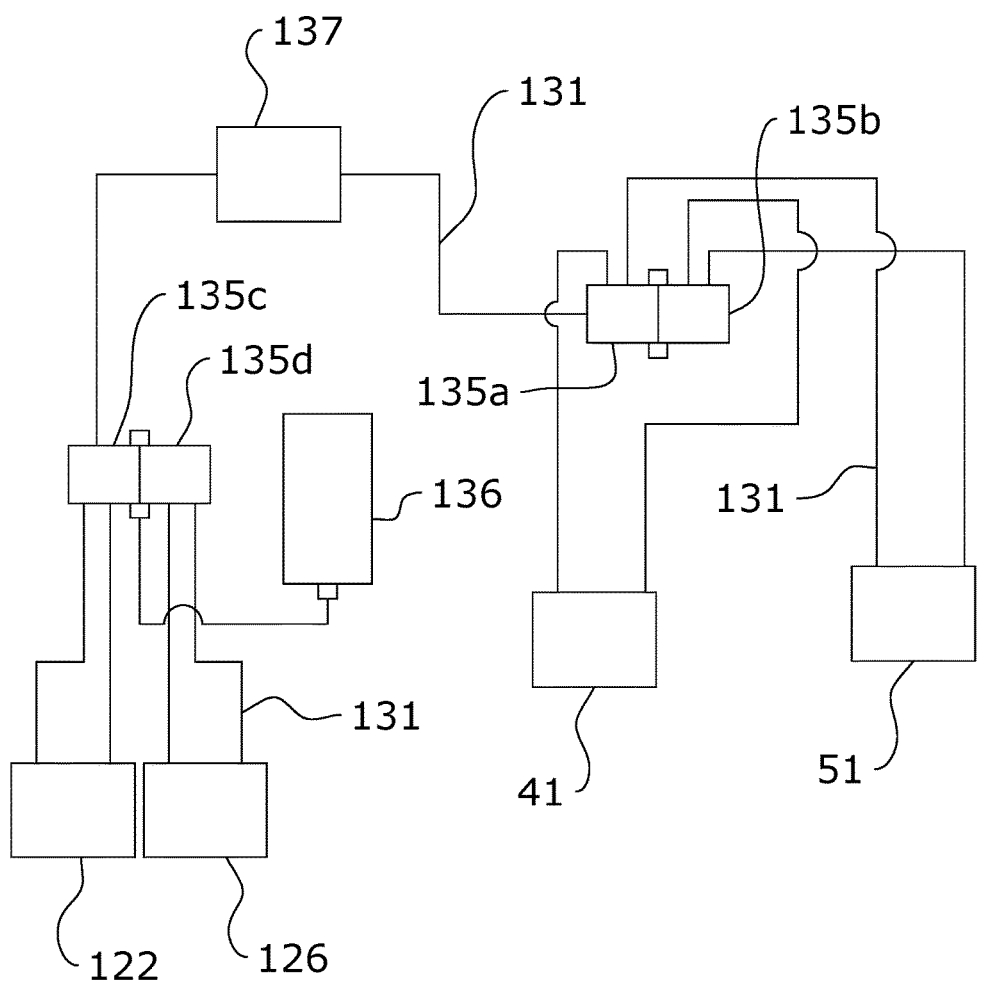
FIG. 30 is a block diagram of a second embodiment of a control assembly of a continuous flow pumping system in accordance with an example embodiment.
Figure 31:
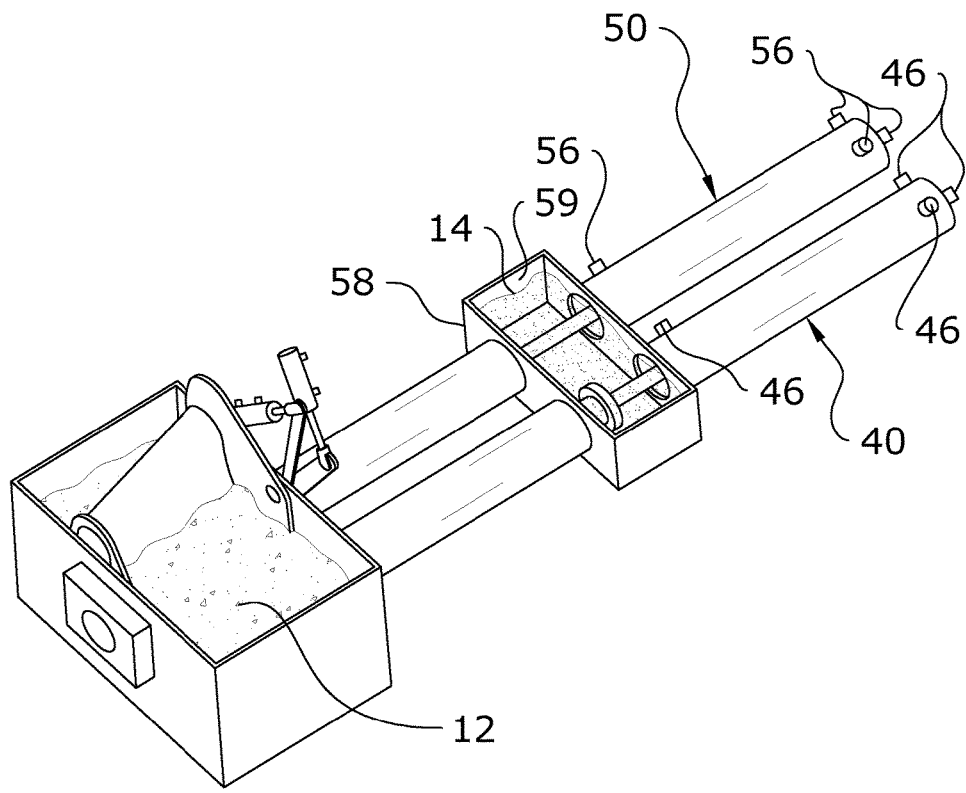
FIG. 31 is an upper perspective view of a continuous flow pumping system in accordance with an example embodiment.

FIG. 30 illustrates a simpler control assembly 130 for operating the cylinders 40, 50 and rotator assembly 120. In this embodiment of the control assembly 130, first valves 135a are directional valves connected to the first cylinder 40 and second valves 135b are directional valves connected to the second cylinder 50 to operate the respective cylinders 40, 50 with complete control of all motion. The third and fourth valves 135c, 135d operate the rotator assembly 120; with the third valves 135c operating the first rotator actuator 122 and the fourth valves 135d operating the second rotator actuator 126. These valves 135c, 135d may be tied to an accumulator 136a, 136b.

G. Operation of Cylinder Open/Closed Loop Circuit

Each of the cylinders 40, 50 is controlled independently such that movement of the first cylinder actuator 41 is independent of movement of the second cylinder actuator 51 to effectuate a continuous flow of materials. Each cylinder 40, 50 includes cylinder sensors 44, 54 which communicate to the controller 137 the precise position of the pistons 43, 53 to allow for coordinated movements of the pistons 43, 53 and uniform shifting between intake strokes and exhaust strokes by the pistons 43, 53. This ensures continuous flow of materials 12 regardless of variable resistance.

Figure 32:
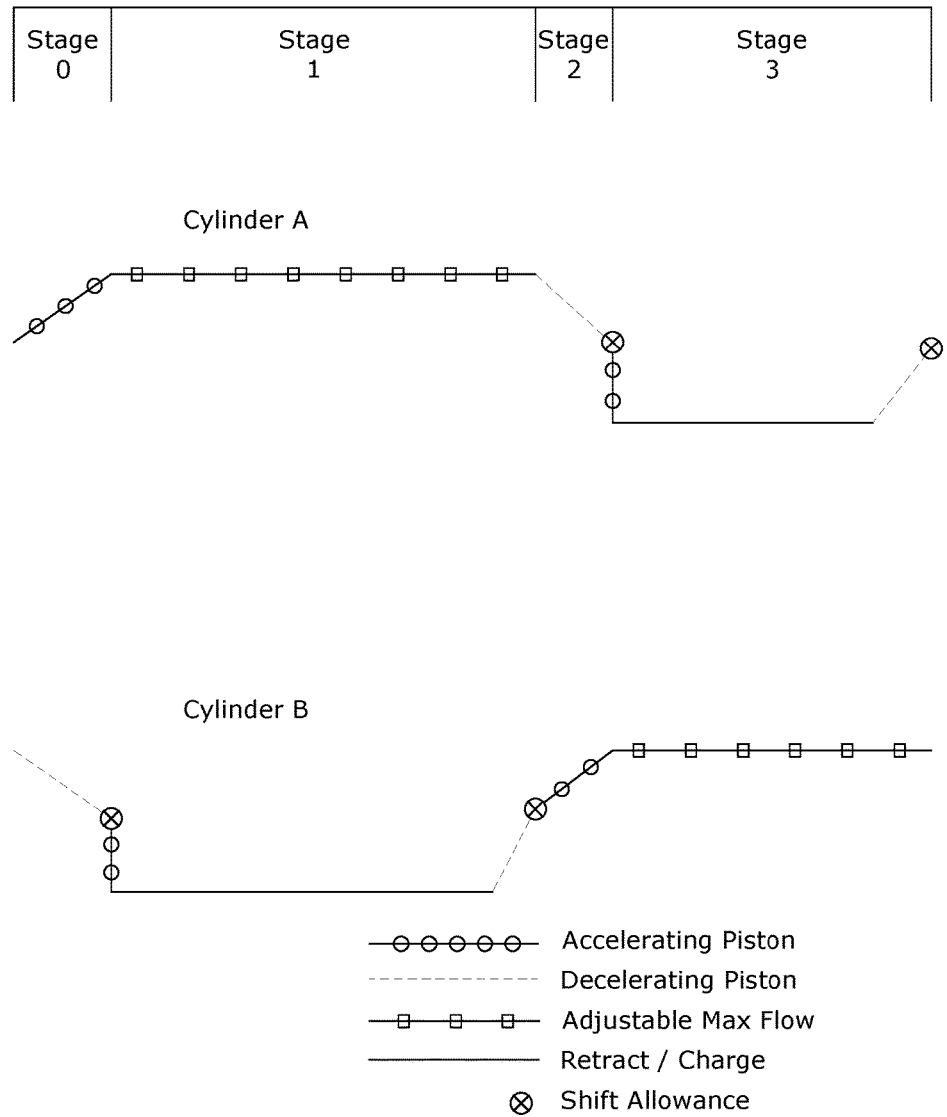
FIG. 32 is a graph illustrating the cylinder cycles of a continuous flow pumping system in accordance with an example embodiment.

FIG. 32 illustrates exemplary continuous flow cycles to control the cylinders 40, 50 to effectuate continuous flow of materials 12. As shown therein, in Stage 1 the first cylinder 40 is charging while the second cylinder 50 discharges. Conversely, in Stage 3 the second cylinder 50 is charging while the first cylinder 40 discharges. Stage 0 represents commencement of advancing movement of the first cylinder 40 prior to discharging in Stage 1 and commencement of retracting movement of the second cylinder 50 prior to charging in Stage 1. Stage 2 represents commencement of retracting movement of the second cylinder 50 prior to charging in Stage 3 and commencement of advancing movement of the first cylinder 40 prior to discharging in Stage 3.

In Stage 1, the charged first cylinder 40 adjusts extends to allow for max flow discharging of materials 12 while the second cylinder 50 charges. Once the second cylinder 50 is charged, Stage 2 is commenced in which the first cylinder 40 decelerates to a halt at the same rate as the second cylinder 50 accelerates to adjustable max flow to discharge materials 12. When the first cylinder 40 stops, the second cylinder 50 is at marked max and the system may shift into Stage 3 in which the second cylinder 50 discharges.

After shifting from Stage 2, the discharged cylinder 40 charges in retract faster than the discharge rate of the charged cylinder 50 to allow for tethering and shifting back to Stage 0. The same cycle is utilized for Stages 1 and 3.

Though each cylinder 40, 50 is independent of the other, they can still operate in an efficient closed loop circuit on their open end while in Stages 1 and 3. For Stages 0 and 2, the control assembly 130 shifts into an open loop circuit. As both cylinders 40, 50 discharge, the displacing hydraulic fluids may be stored in an accumulator 136a, 136b.

If cooling is needed, the hydraulic fluids may return to the tank 132. As shown in FIG. 29, a cooler 133 may be connected to the tank 132 for cooling the tank 132. The cooling of the tank 132 will by extension provide cooling to the fluids within the tank 132. In some embodiments, the cooler 133 may instead be configured to directly cool the fluids rather than the tank 132 in which the fluids are stored.

When reverting back to a closed loop in Stage 1, the stored hydraulic fluids may efficiently retract the first second cylinder 50 faster than the first cylinder 40 is extending. Conversely when reverting back to a closed loop in Stage 3, the stored hydraulic fluids may efficiently retract the first cylinder 40 faster than the second cylinder 50 is extending. If the hydraulic fluids from Stages 0 or 2 went to the tank 132 (such as to be cooled), pumps 134 may be activated to add what is needed to meet the cycle.

H. Operation of Preferred Embodiment

In use, the diverter valve 70 is rotated in conjunction with the intake and exhaust strokes of the cylinders 40, 50 to effectuate a constant flow of materials 12 out of the container 20. The diverter valve 70 rotates between various positions which ensure that material 12 is constantly flowing through the valve outlet 79.

FIGS. 21a-21e illustrate positioning of the diverter valve 70 throughout all cycles to allow for continuous flow of materials 12. Generally speaking, when the valve inlet 76 is fluidly connected to the first cylinder 40, the first cylinder piston 43 will undergo an exhaust cycle to push materials 12 through the valve inlet 76. Similarly, when the valve inlet 76 is fluidly connected to the second cylinder 50, the second cylinder piston 53 will undergo an exhaust cycle to push materials 12 through the valve inlet 76. When the valve inlet 76 is fluidly connected to both the first cylinder 40 and the second cylinder 50, both the first cylinder piston 43 and the second cylinder piston 53 will undergo exhaust cycles to both push materials 12 through the valve inlet 76.

The cylinder pistons 43, 53 should stop all motion when the respective blocking portion 80, 90 is covered by the respective blocking portion 80, 90. For example, the first cylinder piston 43 should stop all motion when the second blocking portion 90 covers and seals the first transfer opening 34. Similarly, the second cylinder piston 43 should stop all motion when the first blocking portion 80 covers and seals the second transfer opening 35. This ensures that pressure differentials are not created that could damage the system overall.

When the valve inlet 76 is not in fluid communication with the cylinders 40, 50, the respective cylinder 40, 50 may undergo an intake cycle to draw materials 12 from the container 20 via the transfer openings 34, 35. For example, when neither the valve inlet 76 nor the second blocking portion 90 is covering the first transfer opening 34, a fluid connection directly between the container 20 and the first cylinder 40 is achieved and the first cylinder piston 43 will undergo an intake cycle to pull materials 12 from the container 20 into the first cylinder 40. Similarly, when neither the valve inlet 76 nor the first blocking portion 80 is covering the second transfer opening 35, a fluid connection directly between the container 20 and the second cylinder 50 is achieved and the second cylinder piston 53 will undergo an intake cycle to pull materials from the container 20 into the second cylinder 50. The stages of motion of the respective cylinders 40, 50 is described above in the description of the operation of the open/closed loop circuit.

FIGS. 21a-21e illustrate the rotational movement of the diverter valve 70 between a plurality of positions. FIG. 21d illustrates a first position of the diverter valve 70 in which the first blocking portion 80 covers the first transfer opening 34 and the valve inlet 76 is in fluid communication with the second transfer opening 35. When the diverter valve 70 is in the first position, the first piston 43 of the first cylinder 40 will stop all motion and the second piston 53 of the second cylinder 50 may undergo an exhaust cycle to push materials 12 through the diverter valve 70.

FIG. 21b illustrates a second position of the diverter valve 70 in which the second blocking portion 90 covers the second transfer opening 35 and the valve inlet 76 is in fluid communication with the first transfer opening 34. When the diverter valve 70 is in the second position, the second piston 53 of the second cylinder 50 will stop all motion and the first piston 43 of the first cylinder 40 may undergo an exhaust cycle to push materials 12 through the diverter valve 70.

FIG. 21c illustrates a third position of the diverter valve 70 in which the valve inlet 76 is in fluid communication with both the first transfer opening 34 and the second transfer opening 35. This position may be utilized when both of the cylinders 40, 50 are discharging.

FIG. 21a illustrates a fourth position of the diverter valve 70 in which the valve inlet 76 is in fluid communication with the first transfer opening 34 and the second transfer opening 35 is not covered by either of the blocking portions 80, 90. In this position, the first cylinder 40 may discharge while the second cylinder 50 charges.

FIG. 21e illustrates a fifth position of the diverter valve 70 in which the valve inlet 76 is in fluid communication with the second transfer opening 35 and the first transfer opening 34 is not covered by either of the blocking portions 80, 90. In this position, the first cylinder 40 may charge while the second cylinder 50 discharges.

Unless otherwise defined, all technical and scientific terms used herein have the same meaning as commonly understood by one of ordinary skill in the art to which this invention belongs. Although methods and materials similar to or equivalent to those described herein can be used in the practice or testing of the continuous flow pumping system, suitable methods and materials are described above. All publications, patent applications, patents, and other references mentioned herein are incorporated by reference in their entirety to the extent allowed by applicable law and regulations. The continuous flow pumping system may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A continuous flow pumping system, comprising:
a container for storing a material to be dispensed, the container comprising a first end and a second end, wherein the first end of the container comprises an inner wall and an outer wall, wherein the first end of the container comprises a first transfer opening and a second transfer opening, wherein the second end of the container comprises an outlet opening;
a first cylinder fluidly connected to the first transfer opening, wherein the first cylinder is connected to the outer wall of the first end of the container;
a second cylinder fluidly connected to the second transfer opening, wherein the second cylinder is connected to the outer wall of the first end of the container; and
a diverter valve rotatably connected to the container for controlling flow of the material between the container, the first cylinder, and the second cylinder, wherein the diverter valve is comprised of a valve inlet, a valve outlet, a first blocking portion, and a second blocking portion, wherein the valve outlet is fluidly connected to the outlet opening of the container,
wherein the diverter valve is adapted to rotate between a plurality of positions, wherein the plurality of positions comprises a first position in which the first blocking portion covers the first transfer opening and a second position in which the second blocking portion covers the second transfer opening, wherein in the first position the valve inlet is in fluid communication with the second transfer opening, wherein in the second position the valve inlet is in fluid communication with the first transfer opening, wherein the first blocking portion comprises a first reinforcement portion comprising a plurality of first reinforcement members movably connected within a plurality of first tracks of the first blocking portion which intersect at a first central gap and the second blocking portion comprises a second reinforcement portion comprising a plurality of second reinforcement members movably connected within a plurality of second tracks of the second blocking portion which intersect at a second central gap.

2. The continuous flow pumping system of claim 1, wherein the first reinforcement members are adapted to be retained in the first central gap when the first blocking portion does not cover the second transfer opening, wherein the second reinforcement members are adapted to be retained in the second central gap when the second blocking portion does not cover the first transfer opening.

3. The continuous flow pumping system of claim 2, wherein the first reinforcement members are adapted to move along the first tracks out of the first central gap when the first blocking portion covers the second transfer opening, wherein the second reinforcement members are adapted to move along the second tracks out of the second central gap when the second blocking portion covers the first transfer opening.

\* \* \* \* \*

UNITED STATES PATENT AND TRADEMARK OFFICE
CERTIFICATE OF CORRECTION

Page 1 of 1

PATENT NO. : 10,001,114 B1
APPLICATION NO. : 15/471959
DATED : June 19, 2018
INVENTOR(S) : Louis M. Jessop It is certified that error appears in the above-identified patent and that said Letters Patent is hereby corrected as shown below:

In the Specification

Column 5, Lines 27-29, "An upper opening 26 in the container 20 provides access to the container 20 so that the cavity 26 may be filled with the materials 12" should read --An upper opening 25 in the container 20 provides access to the container 20 so that the cavity 26 may be filled with the materials 12--

Signed and Sealed this
Thirtieth Day of October, 2018

Andrei Iancu
*Director of the United States Patent and Trademark Office*